US012587319B2

(12) United States Patent
Hooli et al.

(10) Patent No.: US 12,587,319 B2
(45) Date of Patent: Mar. 24, 2026

(54) METHOD, APPARATUS AND COMPUTER PROGRAM FOR PROVIDING FEEDBACK

(71) Applicant: Nokia Technologies Oy, Espoo (FI)

(72) Inventors: Kari Juhani Hooli, Oulu (FI); Karol Schober, Helsinki (FI); Timo Erkki Lunttila, Espoo (FI)

(73) Assignee: Nokia Technologies Oy, Espoo (FI)

( * ) Notice: Subject to any disclaimer, the term of this patent is extended or adjusted under 35 U.S.C. 154(b) by 325 days.

(21) Appl. No.: 18/255,223

(22) PCT Filed: Dec. 10, 2020

(86) PCT No.: PCT/EP2020/085561
§ 371 (c)(1),
(2) Date: May 31, 2023

(87) PCT Pub. No.: WO2022/122163
PCT Pub. Date: Jun. 16, 2022

(65) Prior Publication Data
US 2024/0097830 A1     Mar. 21, 2024

(51) Int. Cl.
*H04L 1/1829* (2023.01)
*H04W 72/232* (2023.01)

(52) U.S. Cl.
CPC ......... *H04L 1/1854* (2013.01); *H04W 72/232* (2023.01)

(58) Field of Classification Search
CPC ... H04L 1/1854; H04L 1/1887; H04L 1/1896; H04W 72/232
See application file for complete search history.

(56) References Cited

U.S. PATENT DOCUMENTS

| | | | | |
|---|---|---|---|---|
| 11,576,174 | B2 * | 2/2023 | Tiirola | H04L 5/0094 |
| 12,022,481 | B2 * | 6/2024 | Yang | H04L 5/0053 |
| 2019/0045489 | A1 * | 2/2019 | He | H04L 1/1812 |
| 2019/0349899 | A1 * | 11/2019 | Ang | H04W 72/0446 |
| 2021/0152292 | A1 * | 5/2021 | Fu | H04W 52/48 |
| 2021/0176762 | A1 * | 6/2021 | Islam | H04B 7/0626 |
| 2021/0243731 | A1 * | 8/2021 | Shin | H04L 5/0094 |

(Continued)

FOREIGN PATENT DOCUMENTS

| | | |
|---|---|---|
| WO | 2019/209082 A1 | 10/2019 |
| WO | 2020/032695 A1 | 2/2020 |

OTHER PUBLICATIONS

"New SID: Study on supporting NR from 52.6GHz to 71 GHz", 3GPP TSG RAN Meeting #86, RP-193259, Agenda: 9.1.1, Intel Corporation, Dec. 9-12, 2019, 3 pages.

(Continued)

*Primary Examiner* — Eric Nowlin
(74) *Attorney, Agent, or Firm* — Lippes Mathias LLP

(57) ABSTRACT

There is provided an apparatus, said apparatus comprising means for determining, at a user equipment, one or more sets of candidate slots for physical downlink shared channel reception for which feedback information is to be provided in a given slot, receiving at least one indication of resources within one of the one or more sets of candidate slots for which feedback information is to be provided in the given slot, determining a feedback codebook based on the one or more sets of candidate slots and the indication and providing feedback information according to the feedback codebook.

14 Claims, 18 Drawing Sheets

(56)     References Cited

U.S. PATENT DOCUMENTS

| 2022/0256573 | A1* | 8/2022 | Frenne | H04W 72/1273 |
| 2022/0321311 | A1* | 10/2022 | Zhou | H04L 5/0053 |
| 2022/0322341 | A1* | 10/2022 | Tiirola | H04L 5/0044 |
| 2022/0353046 | A1* | 11/2022 | Matsumura | H04W 72/231 |
| 2022/0385412 | A1* | 12/2022 | Zhang | H04L 5/0055 |
| 2023/0085896 | A1* | 3/2023 | Takeda | H04L 5/0044 |
| 2023/0216614 | A1* | 7/2023 | Wang | H04L 1/189 370/329 |
| 2023/0388088 | A1* | 11/2023 | Lei | H04W 72/0446 |

OTHER PUBLICATIONS

"3rd Generation Partnership Project; Technical Specification Group Radio Access Network; NR; Physical channels and modulation (Release 16)", 3GPP TS 38.211, V16.1.0, Mar. 2020, pp. 1-130.
"3rd Generation Partnership Project; Technical Specification Group Radio Access Network; NR; Physical layer procedures for control (Release 16)", 3GPP TS 38.213, V16.1.0, Mar. 2020, pp. 1-156.
"3rd Generation Partnership Project; Technical Specification Group Radio Access Network; NR; Multiplexing and channel coding (Release 16)", 3GPP TS 38.212, V16.1.0, Mar. 2020, pp. 1-146.
"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.
International Search Report and Written Opinion received for corresponding Patent Cooperation Treaty Application No. PCT/EP2020/085561, dated Aug. 23, 2021, 16 pages.
"HARQ enhancements in NR unlicensed", 3GPP TSG RAN WG1 Meeting #96bis, R1-1905648, Agenda: 7.2.2.2.3, Huawei, Apr. 8-12, 2019, 13 pages.
"Discussion on semi-static HARQ-ACK codebook for slot aggregation", 3GPP TSG RAN WG1 Meeting #92bis, R1-1803698, Agenda: 7.2.5, Huawei, Apr. 16-20, 2018, 6 pages.
"Remaining issues on HARQ-ACK codebook", 3GPP TSG RAN WG1 Meeting #93, R1-1806301, Agenda: 7.1.3.4.2, CATT, May 21-25, 2018, 7 pages.

* cited by examiner 300
304
303
302
301

PDCCH
PDSCH

Figure 6

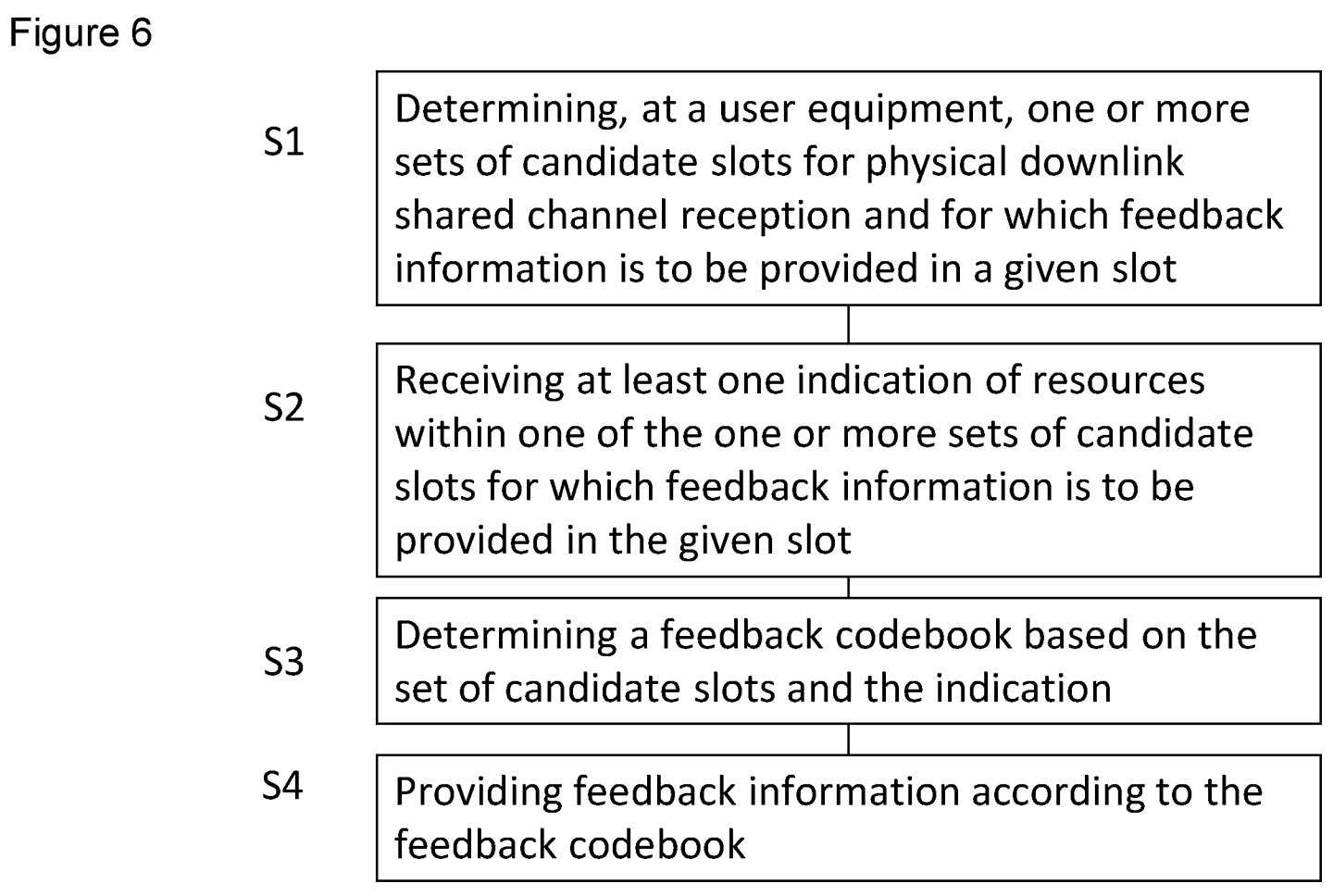

S1
Determining, at a user equipment, one or more sets of candidate slots for physical downlink shared channel reception and for which feedback information is to be provided in a given slot S2
Receiving at least one indication of resources within one of the one or more sets of candidate slots for which feedback information is to be provided in the given slot S3
Determining a feedback codebook based on the set of candidate slots and the indication S4
Providing feedback information according to the feedback codebook

Figure 7

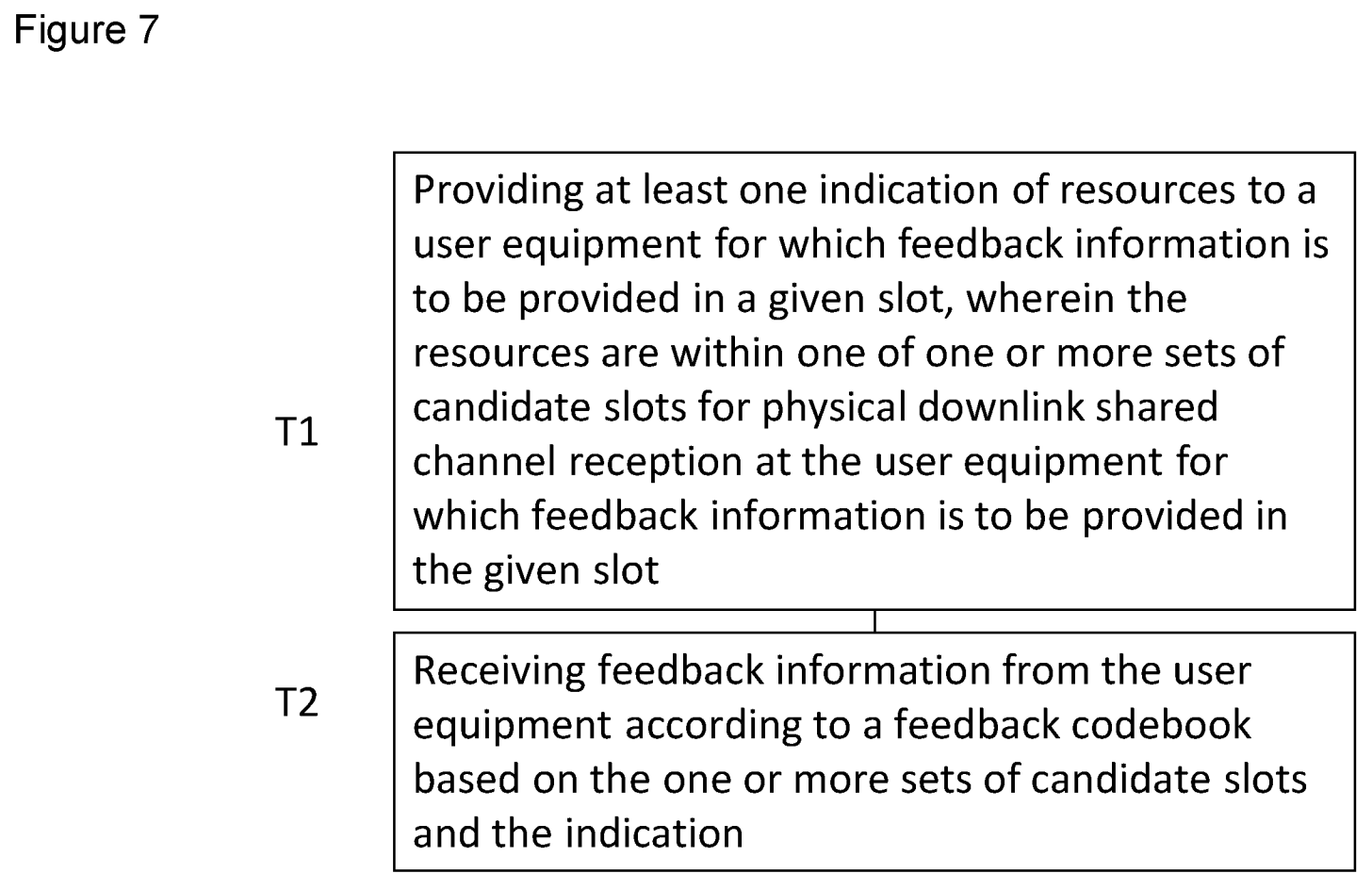

Providing at least one indication of resources to a user equipment for which feedback information is to be provided in a given slot, wherein the resources are within one of one or more sets of candidate slots for physical downlink shared channel reception at the user equipment for which feedback information is to be provided in the given slot

T1

Receiving feedback information from the user equipment according to a feedback codebook based on the one or more sets of candidate slots and the indication

T2

Figure 13
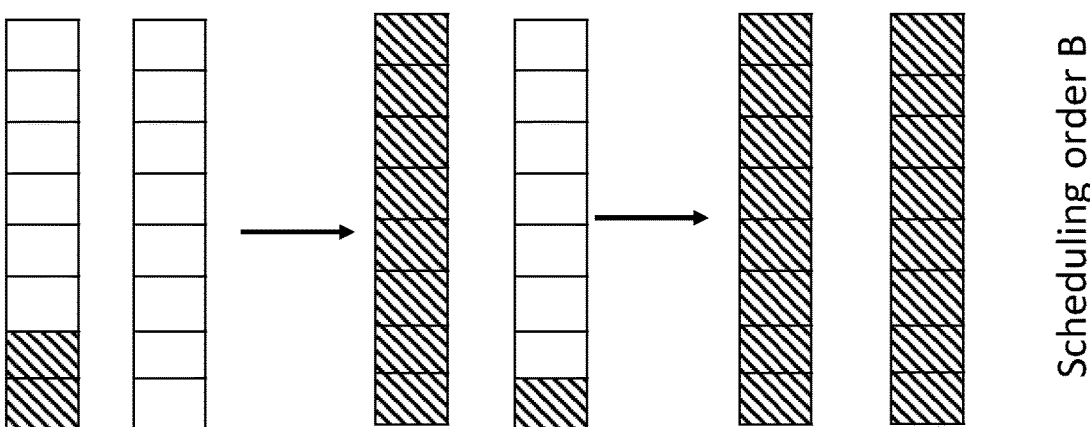
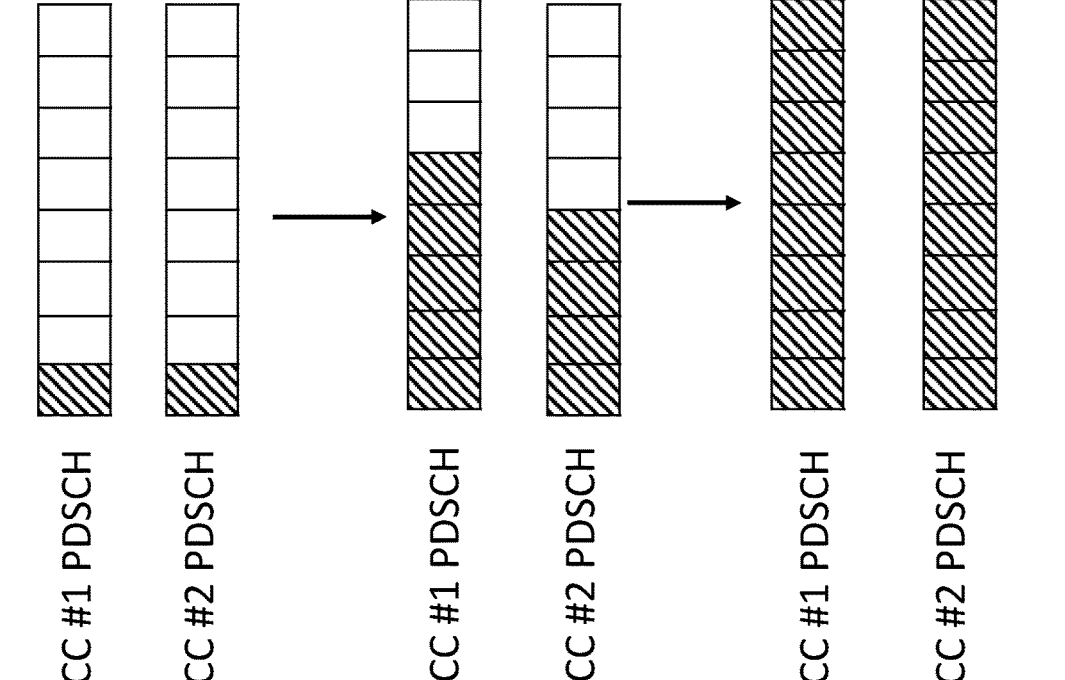
CC #1 PDSCH        CC #1 PDSCH        CC #1 PDSCH
CC #2 PDSCH        CC #2 PDSCH        CC #2 PDSCH
Scheduling order A
Scheduling order B Receive configuration of PDCCH monitoring occasions, multi-PDSCH scheduling, [PDSCH scheduling sets], set size indicator values Receive multi-PDSCH DCI with set size indicator Determine CB based on detected DCIs, candidate PDSCH scheduling sets, set size indicator Transmit HARQ feedback CB

METHOD, APPARATUS AND COMPUTER PROGRAM FOR PROVIDING FEEDBACK

RELATED APPLICATION

This application was originally filed as PCT Application No. PCT/EP2020/085561 on Dec. 10, 2020, which is incorporated herein by reference in its entirety.

FIELD

The present application relates to a method, apparatus, system and computer program and in particular but not exclusively to a HARQ-ACK codebook for multiple PDSCH scheduled by a single PDCCH scheduling occasion.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices (also referred to as station or user equipment) and/or application servers. The communication sessions may comprise, for example, communication of data for carrying communications such as voice, video, electronic mail (email), text message, multimedia, content data, time-sensitive network (TSN) flows and/or data in an industrial application such as critical system messages between an actuator and a controller, critical sensor data (such as measurements, video feed etc.) towards a control system and so on. Non-limiting examples of services provided comprise two-way or multi-way calls, data communication or multimedia services and access to a data network system, such as the Internet.

In a wireless communication system at least a part of a communication session, for example, between at least two stations or between at least one station and at least one application server (e.g. for video), occurs over a wireless link. Examples of wireless systems comprise public land mobile networks (PLMN) operating based on 3GPP radio standards such as E-UTRA, New Radio, satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access one or more carriers provided by the network, for example a base station of a cell, and transmit and/or receive communications on the one or more carriers. In carrier aggregation (CA) two or more carriers are combined and used for communication from a single site, typically. In dual connectivity (DC), two carriers from different sites may be combined, that is a user equipment may be dual (or multi) connected to two (or more) sites, such in non standalone deployment of 5G together with 4G.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) based on the E-UTRAN radio-access technology, and so-called 5G system (5GS) including the 5G or next generation core (NGC) and the 5G Access network based on the New Radio (NR) radio-access technology. 5GS including NR are being standardized by the 3rd Generation Partnership Project (3GPP).

SUMMARY

In a first aspect there is provided an apparatus, said apparatus comprising means for determining, at a user equipment, one or more sets of candidate slots for physical downlink shared channel reception for which feedback information is to be provided in a given slot, receiving at least one indication of resources within one of the one or more sets of candidate slots for which feedback information is to be provided in the given slot, determining a feedback codebook based on the one or more sets of candidate slots and the indication and providing feedback information according to the feedback codebook.

The apparatus may comprise means for determining the one or more sets of candidate slots based on the given slot and a plurality of feedback transmission slot timing values configured to the user equipment.

The apparatus may comprise means for monitoring a control channel for downlink scheduling assignments every Mth slot, where M is greater than 1.

The apparatus may comprise means for determining the one or more sets of candidate slots based on the value of M.

The one or more sets of candidate slots may comprise one or more serving cells.

Each of the more than one sets of candidate slots may be per serving cell and the indication of the resources within one of the sets of candidate slots may be common for each serving cell.

The indication may be common for each of the more than one sets of candidate slots.

The indication may comprise at least one of an indication of a number of bits to be included in the feedback information, an indication of serving cells in the resources within the candidate slots for which feedback information is to be provided and a bitmap of resources within the set of candidate slots for which feedback is provided.

The indication of the number of bits to be included in the feedback information may be per set of candidate slots or per serving cell.

The indication of the number of bits to be included in the feedback information may comprise one of a set of configured values or an integer fraction of the number of slots in the one or more sets of candidate slots.

The apparatus may comprise means for receiving the indication in downlink control information comprising assignments for one or more physical downlink shared channel transmissions.

In a second aspect there is provided an apparatus, said apparatus comprising means for providing at least one indication of resources to a user equipment for which feedback information is to be provided in a given slot, wherein the resources are within one of one or more sets of candidate slots for physical downlink shared channel reception at the user equipment for which feedback information is to be provided in the given slot and receiving feedback information from the user equipment according to a feedback codebook based on the one or more sets of candidate slots and the indication.

The user equipment may monitor a control channel for downlink scheduling assignments every Mth slot, where M is greater than 1.

Each of the one or more sets of candidate slots may comprise one or more serving cells.

Each of the more than one sets of candidate slots may be per serving cell and the indication of the resources within one of the sets of candidate slots may be common for each serving cell.

The indication may be common for each of the more than one sets of candidate slots.

The indication may comprise at least one of an indication of a number of bits to be included in the feedback information, an indication of serving cells in the resources within the candidate slots for which feedback information is to be provided and a bitmap of resources within the set of candidate slots for which feedback is provided.

The indication of the number of bits to be included in the feedback information may be per set of candidate slots or per serving cell.

The indication of the number of bits to be included in the feedback information may comprise one of a set of configured values or an integer fraction of the number of slots in the one or more sets of candidate slots.

The apparatus may comprise means for determining the indication based on the number of transport blocks or the number physical downlink shared channel slots for which feedback information is to be reported.

The apparatus may comprise means for providing the indication in downlink control information comprising assignments for one or more physical downlink shared channel transmissions.

In a third aspect there is provided a method, said method comprising determining, at a user equipment, one or more sets of candidate slots for physical downlink shared channel reception for which feedback information is to be provided in a given slot, receiving at least one indication of resources within one of the one or more sets of candidate slots for which feedback information is to be provided in the given slot, determining a feedback codebook based on the one or more sets of candidate slots and the indication and providing feedback information according to the feedback codebook.

The method may comprise determining the one or more sets of candidate slots based on the given slot and a plurality of feedback transmission slot timing values configured to the user equipment.

The method may comprise monitoring a control channel for downlink scheduling assignments every Mth slot, where M is greater than 1.

The method may comprise determining the one or more sets of candidate slots based on the value of M.

The one or more sets of candidate slots may comprise one or more serving cells.

Each of the more than one sets of candidate slots may be per serving cell and the indication of the resources within one of the sets of candidate slots may be common for each serving cell.

The indication may be common for each of the more than one sets of candidate slots.

The indication may comprise at least one of an indication of a number of bits to be included in the feedback information, an indication of serving cells in the resources within the candidate slots for which feedback information is to be provided and a bitmap of resources within the set of candidate slots for which feedback is provided.

The indication of the number of bits to be included in the feedback information may be per set of candidate slots or per serving cell.

The indication of the number of bits to be included in the feedback information may comprise one of a set of configured values or an integer fraction of the number of slots in the one or more sets of candidate slots.

The method may comprise receiving the indication in downlink control information comprising assignments for one or more physical downlink shared channel transmissions.

In a fourth aspect there is provided a method, said method comprising providing at least one indication of resources to a user equipment for which feedback information is to be provided in a given slot, wherein the resources are within one of one or more sets of candidate slots for physical downlink shared channel reception at the user equipment for which feedback information is to be provided in the given slot and receiving feedback information from the user equipment according to a feedback codebook based on the one or more sets of candidate slots and the indication.

The user equipment may monitor a control channel for downlink scheduling assignments every Mth slot, where M is greater than 1.

Each of the one or more sets of candidate slots may comprise one or more serving cells.

Each of the more than one sets of candidate slots may be per serving cell and the indication of the resources within one of the sets of candidate slots may be common for each serving cell.

The indication may be common for each of the more than one sets of candidate slots.

The indication may comprise at least one of an indication of a number of bits to be included in the feedback information, an indication of serving cells in the resources within the candidate slots for which feedback information is to be provided and a bitmap of resources within the set of candidate slots for which feedback is provided.

The indication of the number of bits to be included in the feedback information may be per set of candidate slots or per serving cell.

The indication of the number of bits to be included in the feedback information may comprise one of a set of configured values or an integer fraction of the number of slots in the one or more sets of candidate slots.

The method may comprise determining the indication based on the number of transport blocks or the number physical downlink shared channel slots for which feedback information is to be reported.

The method may comprise providing the indication in downlink control information comprising assignments for one or more physical downlink shared channel transmissions.

In a fifth apparatus comprising: at least one processor and at least one memory including a computer program code, the at least one memory and computer program code configured to, with the at least one processor, cause the apparatus at least to determine, at a user equipment, one or more sets of candidate slots for physical downlink shared channel reception for which feedback information is to be provided in a given slot, receive at least one indication of resources within one of the one or more sets of candidate slots for which feedback information is to be provided in the given slot, determine a feedback codebook based on the one or more sets of candidate slots and the indication and provide feedback information according to the feedback codebook.

The apparatus may be configured to determine the one or more sets of candidate slots based on the given slot and a plurality of feedback transmission slot timing values configured to the user equipment.

The user equipment may be configured to monitor a control channel for downlink scheduling assignments every Mth slot, where M is greater than 1.

The apparatus may be configured to determine the one or more sets of candidate slots based on the value of M.

The one or more sets of candidate slots may comprise one or more serving cells.

Each of the more than one sets of candidate slots may be per serving cell and the indication of the resources within one of the sets of candidate slots may be common for each serving cell.

The indication may be common for each of the more than one sets of candidate slots.

The indication may comprise at least one of an indication of a number of bits to be included in the feedback information, an indication of serving cells in the resources within the candidate slots for which feedback information is to be provided and a bitmap of resources within the set of candidate slots for which feedback is provided.

The indication of the number of bits to be included in the feedback information may be per set of candidate slots or per serving cell.

The indication of the number of bits to be included in the feedback information may comprise one of a set of configured values or an integer fraction of the number of slots in the one or more sets of candidate slots.

The apparatus may be configured to receive the indication in downlink control information comprising assignments for one or more physical downlink shared channel transmissions.

In a sixth aspect there is provided an apparatus comprising: at least one processor and at least one memory including a computer program code, the at least one memory and computer program code configured to, with the at least one processor, cause the apparatus at least to: provide at least one indication of resources to a user equipment for which feedback information is to be provided in a given slot, wherein the resources are within one of one or more sets of candidate slots for physical downlink shared channel reception at the user equipment for which feedback information is to be provided in the given slot and receive feedback information from the user equipment according to a feedback codebook based on the one or more sets of candidate slots and the indication.

The user equipment may monitor a control channel for downlink scheduling assignments every Mth slot, where M is greater than 1.

Each of the one or more sets of candidate slots may comprise one or more serving cells.

Each of the more than one sets of candidate slots may be per serving cell and the indication of the resources within one of the sets of candidate slots may be common for each serving cell.

The indication may be common for each of the more than one sets of candidate slots.

The indication may comprise at least one of an indication of a number of bits to be included in the feedback information, an indication of serving cells in the resources within the candidate slots for which feedback information is to be provided and a bitmap of resources within the set of candidate slots for which feedback is provided.

The indication of the number of bits to be included in the feedback information may be per set of candidate slots or per serving cell.

The indication of the number of bits to be included in the feedback information may comprise one of a set of configured values or an integer fraction of the number of slots in the one or more sets of candidate slots.

The apparatus may be configured to determine the indication based on the number of transport blocks or the number physical downlink shared channel slots for which feedback information is to be reported.

The apparatus may be configured to provide the indication in downlink control information comprising assignments for one or more physical downlink shared channel transmissions.

In a seventh aspect there is provided a computer readable medium comprising program instructions for causing an apparatus to perform at least the following determining, at a user equipment, one or more sets of candidate slots for physical downlink shared channel reception for which feedback information is to be provided in a given slot, receiving at least one indication of resources within one of the one or more sets of candidate slots for which feedback information is to be provided in the given slot, determining a feedback codebook based on the one or more sets of candidate slots and the indication and providing feedback information according to the feedback codebook.

The apparatus may be caused to perform determining the one or more sets of candidate slots based on the given slot and a plurality of feedback transmission slot timing values configured to the user equipment.

The apparatus may be caused to perform monitoring a control channel for downlink scheduling assignments every Mth slot, where M is greater than 1.

The apparatus may be caused to perform determining the one or more sets of candidate slots based on the value of M.

The one or more sets of candidate slots may comprise one or more serving cells.

Each of the more than one sets of candidate slots may be per serving cell and the indication of the resources within one of the sets of candidate slots may be common for each serving cell.

The indication may be common for each of the more than one sets of candidate slots.

The indication may comprise at least one of an indication of a number of bits to be included in the feedback information, an indication of serving cells in the resources within the candidate slots for which feedback information is to be provided and a bitmap of resources within the set of candidate slots for which feedback is provided.

The indication of the number of bits to be included in the feedback information may be per set of candidate slots or per serving cell.

The indication of the number of bits to be included in the feedback information may comprise one of a set of configured values or an integer fraction of the number of slots in the one or more sets of candidate slots.

The apparatus may be caused to perform receiving the indication in downlink control information comprising assignments for one or more physical downlink shared channel transmissions.

In an eight aspect there is provided a computer readable medium comprising program instructions for causing an apparatus to perform at least the following: providing at least one indication of resources to a user equipment for which feedback information is to be provided in a given slot, wherein the resources are within one of one or more sets of candidate slots for physical downlink shared channel reception at the user equipment for which feedback information is to be provided in the given slot and receiving feedback information from the user equipment according to a feedback codebook based on the one or more sets of candidate slots and the indication.

The user equipment may monitor a control channel for downlink scheduling assignments every Mth slot, where M is greater than 1.

Each of the one or more sets of candidate slots may comprise one or more serving cells.

Each of the more than one sets of candidate slots may be per serving cell and the indication of the resources within one of the sets of candidate slots may be common for each serving cell.

The indication may be common for each of the more than one sets of candidate slots.

The indication may comprise at least one of an indication of a number of bits to be included in the feedback information, an indication of serving cells in the resources within the candidate slots for which feedback information is to be provided and a bitmap of resources within the set of candidate slots for which feedback is provided.

The indication of the number of bits to be included in the feedback information may be per set of candidate slots or per serving cell.

The indication of the number of bits to be included in the feedback information may comprise one of a set of configured values or an integer fraction of the number of slots in the one or more sets of candidate slots.

The apparatus may be caused to perform determining the indication based on the number of transport blocks or the number physical downlink shared channel slots for which feedback information is to be reported.

The apparatus may be caused to perform providing the indication in downlink control information comprising assignments for one or more physical downlink shared channel transmissions.

In a ninth aspect there is provided a non-transitory computer readable medium comprising program instructions for causing an apparatus to perform at least the method according to the third aspect or a method according to the fourth aspect.

In the above, many different embodiments have been described. It should be appreciated that further embodiments may be provided by the combination of any two or more of the embodiments described above.

List of Abbreviations

ACK Acknowledgement
BW Bandwidth
BWP Bandwidth Part
CA Carrier Aggregation
CB Codebook
CBG Code Block Group
CC Component Carrier
CCE Control Channel Element
CP Cyclic Prefix
DAI Downlink Assignment Index
DCI Downlink Control Information
DL Downlink
FFT Fast Fourier Transform
FR Frequency Range gNB New Radio Node B
HARQ Hybrid Automatic Repeat Request
LTE Long Term Evolution
NACK Negative Acknowledgement
NR New Radio
NR-U New Radio Unlicensed
OFDM Orthogonal Frequency Domain Multiplexing
PDCCH Physical Downlink Control Channel
PDSCH Physical Downlink Shared Channel
PRB Physical Resource Block
PUCCH Physical Uplink Control Channel
PUSCH Physical Uplink Shared Channel
QPSK Quadrature Phase Shift Keying
RF Radio Frequency
RRC Radio Resource Control
SCS Subcarrier Spacing
SLIV Start and Length Indicator Value
TB Transport Block
TDM Time Division Multiplexing
TTI Transmission Time Interval
UCI Uplink Control Information
UE User Equipment
UL Uplink

DESCRIPTION OF FIGURES

Embodiments will now be described, by way of example only, with reference to the accompanying Figures in which:

FIG. 6 shows a flowchart of a method according to an example embodiment;

FIG. 7 shows a flowchart of a method according to an example embodiment;

FIG. 13 shows PDSCH scheduling orders according to example embodiments;

DETAILED DESCRIPTION

Before explaining in detail the examples, certain general principles of a wireless communication system and mobile communication devices are briefly explained with reference to FIGS. 1 to 3 to assist in understanding the technology underlying the described examples.

An example of a suitable communications system is the 5G System (5GS). Network architecture in 5GS may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

5G networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Figure 1:
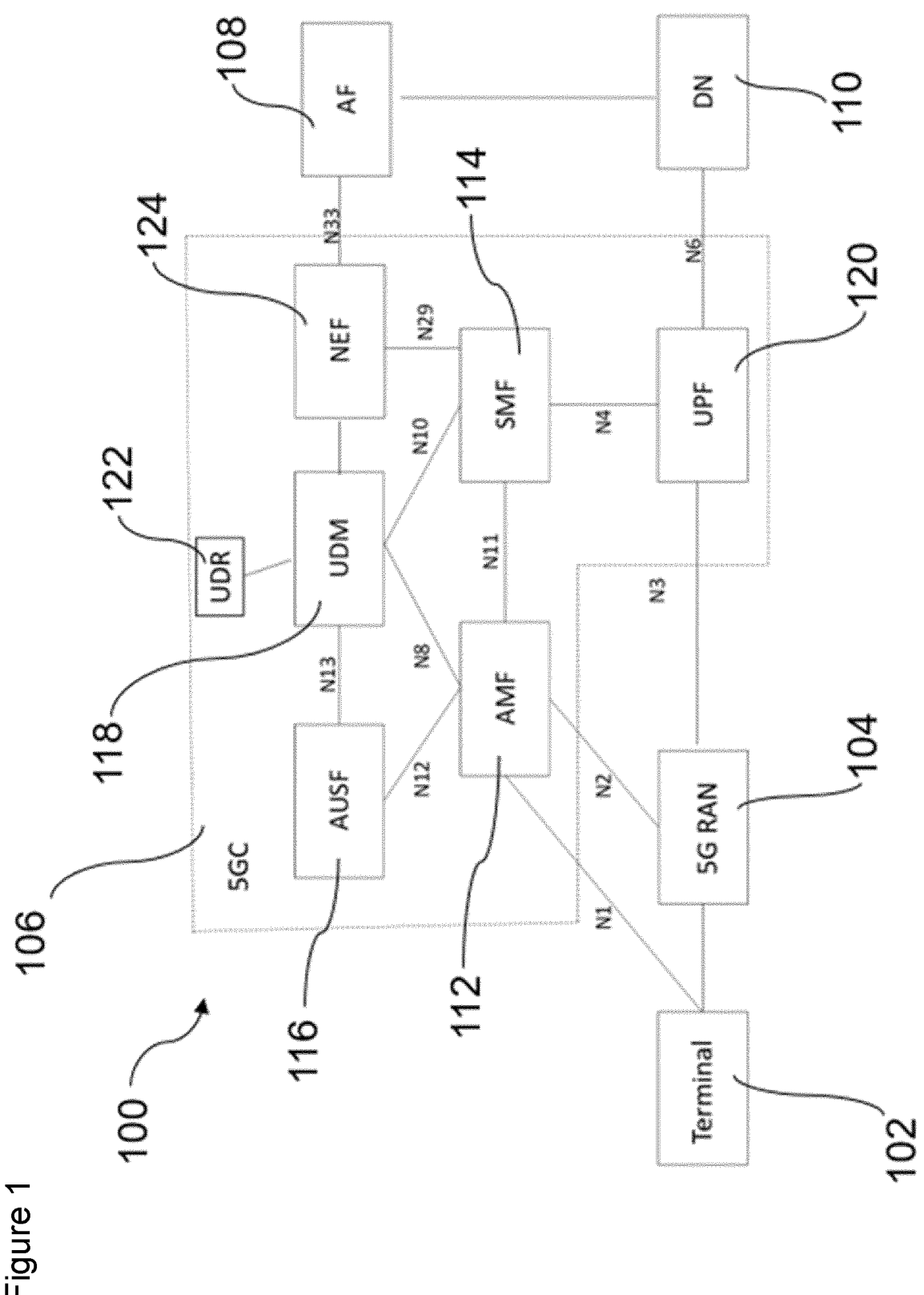
FIG. 1 shows a schematic diagram of an example 5G communication system.

FIG. 1 shows a schematic representation of a 5G system (5GS) 100. The 5GS may comprise a user equipment (UE) 102 (which may also be referred to as a communication device or a terminal), a 5G radio access network (SGRAN) 104, a 5G core network (SGCN) 106, one or more application functions (AF) 108 and one or more data networks (DN) 110.

An example 5G core network (CN) comprises functional entities. The SGCN 106 may comprise one or more access and mobility management functions (AMF) 112, one or more session management functions (SMF) 114, an authentication server function (AUSF) 116, a unified data management (UDM) 118, one or more user plane functions (UPF) 120, a unified data repository (UDR) 122 and/or a network exposure function (NEF) 124. The UPF is controlled by the SMF (Session Management Function) that receives policies from a PCF (Policy Control Function).

The CN is connected to a terminal device via the radio access network (RAN). The SGRAN may comprise one or more gNodeB (gNB) distributed unit functions connected to one or more gNodeB (GNB) centralized unit functions. The RAN may comprise one or more access nodes.

A UPF (User Plane Function) whose role is called PSA (PDU Session Anchor) may be responsible for forwarding frames back and forth between the DN (data network) and the tunnels established over the 5G towards the UE(s) exchanging traffic with the DN.

Figure 2:
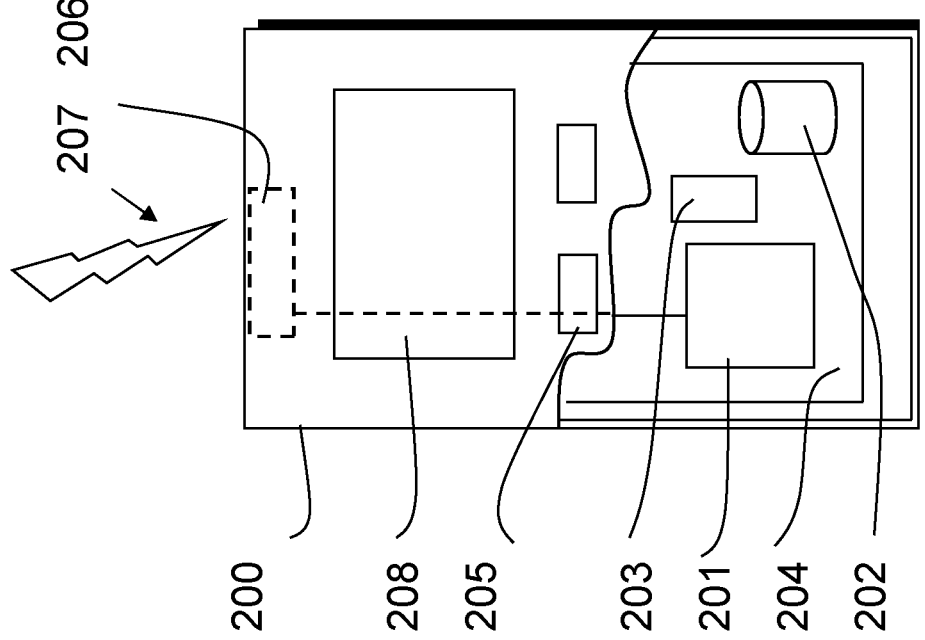
FIG. 2 shows a schematic diagram of an example mobile communication device.

A possible terminal device will now be described in more detail with reference to FIG. 2 showing a schematic, partially sectioned view of a communication device 200. Such a communication device is often referred to as user equipment (UE). An appropriate communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
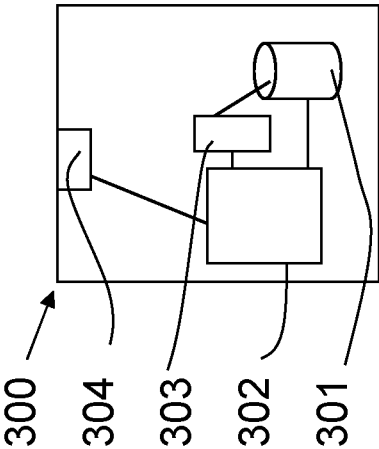
FIG. 3 shows a schematic diagram of an example control apparatus.

FIG. 3 shows an example embodiment of a control apparatus for a communication system, for example to be coupled to and/or for controlling a station of an access system, such as a RAN node, e.g. a base station, eNB or gNB, a relay node or a core network node such as an Mobility Management Entity (MME) or Serving Gateway (S-GW) or Packet Data Network Gateway (P-GW), or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

The following relates to 3GPP New Radio (NR) physical layer design.

There is a study of required changes to NR using existing DL/UL NR waveform to support operation between 52.6 GHz and 71 GHz and of the applicable numerology including subcarrier spacing, channel BW (including maximum BW), and their impact to FR2 physical layer design to support system functionality considering practical RF impairments. The study also aims to identify potential critical problems to physical signal/channels, if any.

There is also a study of channel access mechanism, considering potential interference to/from other nodes, assuming beam-based operation, in order to comply with the regulatory requirements applicable to unlicensed spectrum for frequencies between 52.6 GHz and 71 GHz. Potential interference impact, if identified, may require interference mitigation solutions as part of channel access mechanism.

Support for multiple numerologies is one of the basic features in NR. Table 1 shows the physical layer numerologies supported by Rel-15 NR. NR Rel-15 utilizes time-frequency scaling with respect to LTE numerology (where subcarrier spacing (SCS) is 15 kHz). Scaling is characterized by a scaling factor $2^{\mu}$ and scaling decreases the time domain properties (such as slot/OFDM symbol/CP length) by factor of $2^{\mu}$ while increasing the frequency domain properties (such as subcarrier spacing and PRB size in frequency) by factor of $2^{\mu}$.

TABLE 1

| $\mu$ | $\Delta f = 2^{\mu} \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Larger subcarrier spacing may lead to larger carrier bandwidth for a given FFT size. NR Rel-15 supports BWP size of 275 PRBs. This means that the maximum BWP size according to NR Rel-15 is 396 MHz (0.12 MHz*12*275). This is not enough for scenarios above 52.6 GHz where aggregated system bandwidth can be as high as 14 GHz (57-71 GHz).

Larger subcarrier spacing may lead to shorter symbol duration and potentially lower latency, reduced sensitivity to phase noise (phase noise increases with increasing carrier frequency) and/or reduced CP length (for a given CP overhead)

Larger subcarrier spacings, such as at least one of 480 KHz and 960 kHz, are expected to be introduced for beyond 52.6 GHz bands to tackle increase in phase noise, and to provide larger carrier bandwidth with reasonable FFT size, (i.e. number of subcarriers). This may be achieved by extending the numerology scaling framework defined in NR Rel-15 to support additional values for p, e.g. up to $\mu=6$ (corresponding to 960 kHz SCS).

In R15, the maximum number of PDCCH blind decodes and channel estimates (in terms of number of unique control channel elements (CCEs)) a UE is capable to perform per slot is defined in TS38.213 Tables 10.1-2 and 10.1-3 as a function of SCS. As can be observed, the UE capability numbers decrease considerably with increasing subcarrier spacing.

TABLE 10.1-2

Maximum number $M_{PDCCH}^{max, \, slot, \, \mu}$ of monitored PDCCH candidates per slot for a DL BWP with SCS configuration $\mu \in \{0, 1, 2, 3\}$ for a single serving cell

| $\mu$ | Maximum number of monitored PDCCH candidates per slot and per serving cell $M_{PDCCH}^{max, \, slot, \, \mu}$ |
|---|---|
| 0 | 44 |
| 1 | 36 |
| 2 | 22 |
| 3 | 20 |

TABLE 10.1-3

Maximum number $C_{PDCCH}^{max, \, slot, \, \mu}$ of non-overlapped CCEs per slot for a DL BWP with SCS configuration $\mu \in \{0, 1, 2, 3\}$ for a single serving cell

| $\mu$ | Maximum number of non-overlapped CCEs per slot and per serving cell $C_{PDCCH}^{max, \, slot, \, \mu}$ |
|---|---|
| 0 | 56 |
| 1 | 56 |
| 2 | 48 |
| 3 | 32 |

When considering, e.g., SCS of 960 kHz, which shortens the slot duration to ⅛th of shortest slot supported in R15 or R16 (i.e. 0.125 ms with SCS of 120 kHz), the rate of PDCCH monitoring and corresponding processing complexity as well as related UE power consumption increase by 8 times. In short, the PDCCH monitoring burden becomes an issue for UE implementation.

Figure 4:
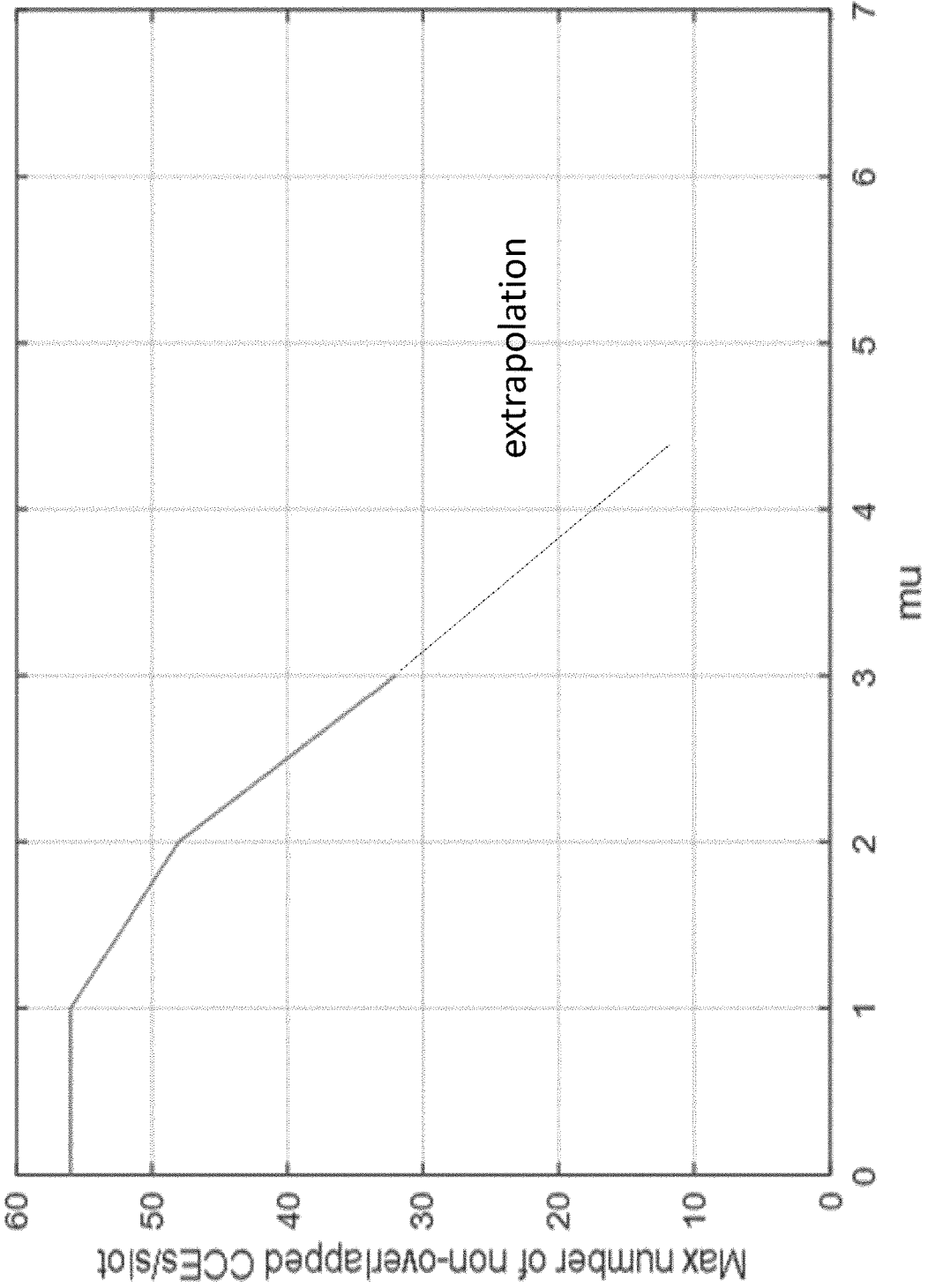
FIG. 4 shows an extrapolation of CCE channel estimation capability as function of scaling value $\mu$.

While UEs are currently capable to estimate 32 CCEs per 120 kHz SCS slot, as shown in FIG. 4, the CCE monitoring budget per 960 kHz slot may be smaller than 10 CCEs, given that CCEs need to be monitor much more frequently (a direct scaling of the number of monitored CCEs by the factor of ⅛ would leave just 4 CCEs). Such budget may not be practically feasible; e.g. it may not allow for one PDCCH candidate of aggregation level 16 (comprising 16 CCEs) in a slot.

Short symbol duration for a constant transmission power means lower signal energy per symbol, which may reduce the achievable coverage.

It may be beneficial to maintain current PDCCH monitoring rate as well as PDCCH transmission duration for cell edge UEs.

One considered option is to support PDCCH with 120 kHz SCS and PDSCH with e.g. 960 kHz SCS: increased phase noise does not impact PDCCH with QPSK modulation, while higher order modulation PDSCH would be supported to boost peak data rates.

Another option using 960 kHz SCS for both PDCCH and PDSCH is to create a larger PDCCH "region" covering e.g. one slot, followed by a number of slots not containing any PDCCH resources.

Figure 5:
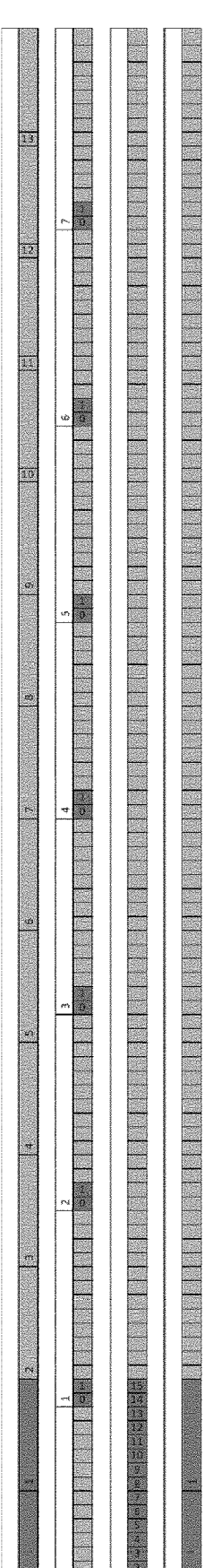
FIG. 5 shows examples of PDCCH structures beyond 52.6 GHz bands.

Various options for PDCCH structure are illustrated in FIG. 5.

The first row presents one slot (14 symbols) for 120 kHz SCS, with 2-symbol PDCCH and 12-symbol PDSCH.

The second row presents 8 slots for 960 kHz SCS. Design is based on a straightforward numerology scaling as used in R15 and R16. One can easily see the increased rate of PDCCH occasions as well as shorter duration of individual PDCCHs.

On the third row, the PDCCH symbols for the 8 slots are collected into single PDCCH region at the beginning of the set of 8 slots. All symbols use 960 kHz SCS.

The fourth row presents the approach based on mixed numerology: PDCCH uses 120 kHz SCS while PDSCH uses 960 kHz SCS.

When considering the outlined solutions for managing the PDCCH monitoring burden (3rd and 4th row in FIG. 5), it may be noted that there are multiple shared channel (PDSCH or PUSCH) slots for each PDCCH. To provide a scheduling DCI for each shared channel slot, scheduling enhancement is needed, e.g. introduction of multi-PDSCH DCI, that is, a single DCI providing DL assignments for multiple PDSCHs (multi-PUSCH scheduling with single DCI was introduced during R16), or support for multiple DL assignments per cell per PDCCH monitoring occasion. The latter option may result in increased DL control overhead.

The following focusses on the multi-PDSCH DCI scheduling case but also the case of multiple DL assignments (scheduling single PDSCH each) per cell per PDCCH monitoring occasion.

R16 NR supports 3 HARQ-ACK codebooks (CB): semi-static Type 1 CB, dynamic Type 2 CB (as well as enhanced Type 2 CB for NR-U), and HARQ-process based Type 3 CB.
Semi-Static Type 1 CB Type 1 CB transmitted in a given slot contains ACK/NACK (A/N) for all possible PDSCH locations that may cause HARQ feedback in that given slot—regardless of the number of PDSCHs that were received. NACK is reported for PDSCH locations for which no PDSCH was received with an indication to transmit corresponding ACK/NACK on the given slot.

Type 1 CB is determined (that is, the CB size and the ordering of HARQ-ACK bits within the CB) based on RRC configured parameters. Hence, the Type 1 CB determination is highly reliable. As a drawback, the CB size may be excessive. The CB size is the same regardless of whether HARQ ACK for a single PDSCH or for a continuous stream of PDSCHs on all configured carriers is reported.

Type 1 CB determination is based on defining the set of candidate PDSCH reception occasions that may cause HARQ feedback on the given slot. The configured serving cells are looped over in the Type 1 CB determination. For each configured serving cell, the slots possibly containing PDSCH (and causing HARQ feedback on the given slot) are identified based e.g. on the configured K1 (PDSCH-to-HARQ-ACK delay) values. After that, possibilities for multiple time-non-overlapping PDSCHs within a slot are identified based on the configured set of PDSCH starting symbols and PDSCH lengths (in so called SLIV pruning). For each candidate PDSCH reception occasion, a configured number (e.g. one or two bits in TB based HARQ feedback, or the number of Code Block Groups (CBGs) in CBG based HARQ feedback) of ACK/NACK bits is inserted.

For example, by assuming 8 K1 values, 2 component carriers or serving cells, 2 time-non-overlapping PDSCH locations in a slot (based on SLIVs), and up to 2 A/N bits per PDSCH, the corresponding Type 1 CB turns out to contain $8 \times 2 \times 2 \times 2 = 64$ ACK/NACK bits. This is significant overhead e.g. when transmitting HARQ feedback for only few scheduled PDSCHs within those PDSCH reception occasions.
Dynamic Type 2 CB Type 2 CB is more efficiently sized than Type 1 CB. Type 2 CB contains ACK/NACKs only for received PDSCHs (based on detected DL assignments) as well as for PDSCHs that UE founds that it has missed (due to failed DL assignment detection).

A UE can identify that it has missed a DL assignment or PDSCH based on a DAI field in the DL assignments that it has detected. DL assignment contains at least a counter DAI, which is simply a counter of DL assignments/PDSCHs that will cause HARQ feedback on the same slot. DL assignment, depending on the DCI format and CA configuration, may also contain a total DAI, which indicates the total number of DL assignments (causing HARQ feedback on the same slot) up to the slot of the DL assignment. Total DAI may be included also in an UL grant when UE is expected to multiplex HARQ feedback to PUSCH transmission.

Type 2 CB has a risk that the CB size and, possibly, A/N ordering are determined erroneously at UE due to UE missing DL assignment(s). Thanks to counter DAI, UE should miss 4 consecutive DL assignment to cause an error at the beginning or on the middle of codebook. However, missing the last DL assignment/PDSCH is the weak spot of Type 2 CB. When the UE has PDSCH scheduled only on a single carrier on the last slot, it is enough that UE misses the DL assignment for the last PDSCH to cause an error on the CB size. To mitigate the error case, gNB may try to decode Type 2 CB with two sizes: the correct one and with UE missing the last DL assignment. Nevertheless, the Type 2 CB size uncertainty can be problematic e.g. for URLLC use cases.

When Type 2 CB is applied to a cell with multi-PDSCH scheduling, each DCI may cause ACK/NACK for 1 to N PDSCHs (where N is the configured maximum number that a DL assignment can schedule, e.g., N=8). A problem is faced as UE does not know the number of scheduled PDSCHs on the DL assignments that it missed, and gNB does not know which DL assignments UE has missed. To solve the problem, Type 2 CB may contain ACK/NACKs corresponding to N PDSCHs for each DL assignment (detected or indicated by DAI). This will increase the Type 2 CB size considerably. Alternatively, counter DAI and total DAI fields are extended in the DCI, and the DAI is incremented per scheduled PDSCH, not per scheduling DCI. For example, both DAI fields should be extended from 2 bits (4 values) to 5 bits (8×4 values) to operate with the same robustness against DCI failed detection in the case of N=8.
HARQ Process Based Type 3 CB Type 3 CB was introduced for NR in R16 NR-U. Type 3 CB contains ACK/NACK information for all configured HARQ processes. This means that Type 3 CB is relatively large (especially in case of CA and CBG based operation with up to 8 ACK/NACK per PDSCH). In R16 NR-U, Type 3 CB is typically used to poll HARQ information from a UE after normal HARQ feedback transmission have failed e.g. due to LBT blocking channel access. Hence, the Type 3 CB is configured together with either Type 1 CB or Type 2 CB, and Type 3 CB transmission is explicitly triggered with a corresponding DCI flag/trigger.

HARQ ACK feedback in the case of multi-PDSCH scheduling should be supported in a manner that is robust (against DCI detection errors) yet efficient in terms of overhead (codebook size).

Based on the discussion above, the existing codebooks may either not be sufficiently robust or resource efficient for multi-PDSCH scheduling.

The following methods may provide CB determination designed for multi-PDSCH scheduling that is robust against DL assignment detection errors yet provides smaller UCI overhead (i.e. smaller HARQ-ACK codebook size). In addition to multi-PDSCH scheduling, we consider robust yet resource efficient HARQ CB determination when PDCCH occurs only in one slot (or set of symbols) for a number of consecutive slots, and PDSCHs are scheduled with multiple DCIs each scheduling single PDSCH.

FIG. 6 shows a flowchart of a method according to an example embodiment.

In a first step, S1, the method comprises determining, at a user equipment, one or more sets of candidate slots for physical downlink shared channel reception and for which feedback information is to be provided in a given slot.

In a second step, S2, the method comprises receiving at least one indication of resources within one of the one or more sets of candidate slots for which feedback information is to be provided in the given slot.

In a third step, S3, the method comprises determining a feedback codebook based on the one or more sets of candidate slots and the indication.

In a fourth step, S4, the method comprises providing feedback information according to the feedback codebook.

FIG. 7 shows a flowchart according to an example embodiment.

In a first step, T1, the method comprises providing at least one indication of resources to a user equipment for which feedback information is to be provided in a given slot, wherein the resources are within one of one or more sets of candidate slots for physical downlink shared channel reception at the user equipment for which feedback information is to be provided in the given slot.

In a second step, T2, the method comprises receiving feedback information from the user equipment according to a feedback codebook based on the one or more sets of candidate slots and the indication.

The user equipment monitors a control channel for downlink scheduling assignments every $M^{th}$ slot and M is greater than 1. That is, the UE is configured with multi-PDSCH scheduling (or multiple DL assignments (scheduling single PDSCH each) per cell per PDCCH monitoring occasion) and sparse PDCCH monitoring (sparse PDCCH monitoring means that UE monitors PDCCH for DL assignments only every Mth slot, M>1).

The feedback information may comprise HARQ-ACK feedback information, also known as ACK/NACK information.

A set of candidate slots for physical downlink shared channel reception may be referred to as a candidate PDSCH scheduling set. The candidate PDSCH scheduling sets contain PDSCH slots for which HARQ feedback could be reported in slot n.

The method may comprise determining the one or more sets of candidate slots based on at least one of the given slot (n), a plurality of feedback transmission slot timing values (K1) configured to the user equipment and the value of M.

In an example embodiment, once a UE receives a DL assignment causing HARQ feedback on slot n, UE determines candidate PDSCH scheduling sets based on slot n and configured K1 values.

A PDSCH scheduling set may be determined to contain the M DL slots between consecutive PDCCH monitoring occasions or, alternatively, N slots after a PDCCH monitoring occasion on a given cell or a carrier. The N slots may be offset (forward) from a PDCCH monitoring occasion by minimum value of the configured K0 values.

M is also the maximum number of PDSCHs schedulable with the configured multi-PDSCH DCI.

If multiple K1 values (from the configured K1 values) indicate the same PDSCH scheduling set, the set is included only once to the candidate PDSCH scheduling sets.

The method may comprise receiving the indication in downlink control information (DCI) comprising assignments for one or more physical downlink shared channel transmissions (i.e., multi-PDSCH scheduling or PDSCHs are scheduled with multiple DCIs each scheduling a single PDSCH).

UE may determine the HARQ-ACK CB based on candidate PDSCH scheduling sets and a set size indicator in DCI, as described below.

Each of the one or more sets of candidate slots may comprise one or more serving cells or each of the more than one sets of candidate slots may be per serving cell. The indication of the resources within one of the sets of candidate slots may be common for each serving cell.

The indication may comprise at least one of an indication of the number of bits to be included in the feedback information, an indication of serving cells in the resources within the candidate slots for which feedback information is to be provided and a bitmap of resources within the set of candidate slots for which feedback is provided.

Where the indication comprises at least one of an indication of the number of bits to be included in the feedback information and an indication of serving cells in the resources within the candidate slots for which feedback information is to be provided, it may be referred to as a set size indicator, S. A predetermined number of ACK/NACK bits is inserted to the codebook for each candidate PDSCH scheduling set. The number of ACK/NACK bits may be RRC configured (as in CB1) or indicated by the DCI set size indicator.

The indication of the number of bits to be included in the feedback information may comprise one of a set of configured values. For example, set size indicator S may indicate a value from a set of RRC configured values.

Alternatively, the indication of the number of bits to be included in the feedback information may comprise an integer fraction of the candidate slot set size. For example, the indicated value may be determined, e.g., as an integer fraction of PDSCH scheduling set size.

The indication may be common for each of the more than one sets of candidate slots. The indication of the resources may be associated with the given slot. For example, the set size indicator may be per HARQ feedback transmission with all DL assignments causing HARQ feedback in the same slot indicating the same set size indicator value. That is, while the signalling of the indication may be separate in a DL assignment for each set, the indication (i.e. the value of the indication) is common for all sets.

In an example embodiment, the set size indicator, S, may comprise at least one of the following: the number of HARQ-ACK bits to be included into HARQ-ACK feedback for the PDSCH transmitted in the candidate PDSCH scheduling sets, where the number is common for all serving cells in the candidate PDSCH scheduling sets and an indication of the serving cells in the candidate PDSCH scheduling sets, for which HARQ-ACK feedback will be provided.

A combination of the above may be provided, i.e., an indication of the serving cells for which HARQ-feedback shall be provided, and the number of HARQ-ACK bits for the serving cells for which HARQ-ACK feedback shall be provided.

The method may be extended to the case of multiple DL assignments per cell per PDCCH monitoring occasion. That is, the indication may be provided in downlink control information comprising an assignment for one physical downlink shared channel transmission per cell for a control channel monitoring occasion. In this case, proper ordering of the HARQ ACK bits corresponding to the different DL assignments is required.

In this case, the indication may comprise a bitmap of resources within the set of candidate slots for which feedback is provided (or location bitmap). That is, set size indicator S may be replaced with Location bitmap L. L indicates the slots within the scheduling set for which UE should report HARQ feedback. The time granularity of location bitmap may be a slot, or multiple (e.g. 2) slots. Similar to the set size indicator, the location bitmap is per HARQ feedback transmission. All DL assignments causing HARQ feedback on the same slot indicate the same location bitmap.

Alternatively, the same Set size indicator S may be indicated in all DL assignments causing HARQ feedback in the same slot, and the placement of HARQ-ACK bits within the bit container corresponding to the Set size indicator S is determined based on slot index n of Scheduled PDSCH within the candidate PDSCH scheduling set. For example, the placement of bits may be given as mod (n,S). The advantage is that design may be the same for UEs with and without multi-TTI scheduling capability. The DCI overhead of Set size indicator S may be smaller than Location bitmap L.

Figure 8:
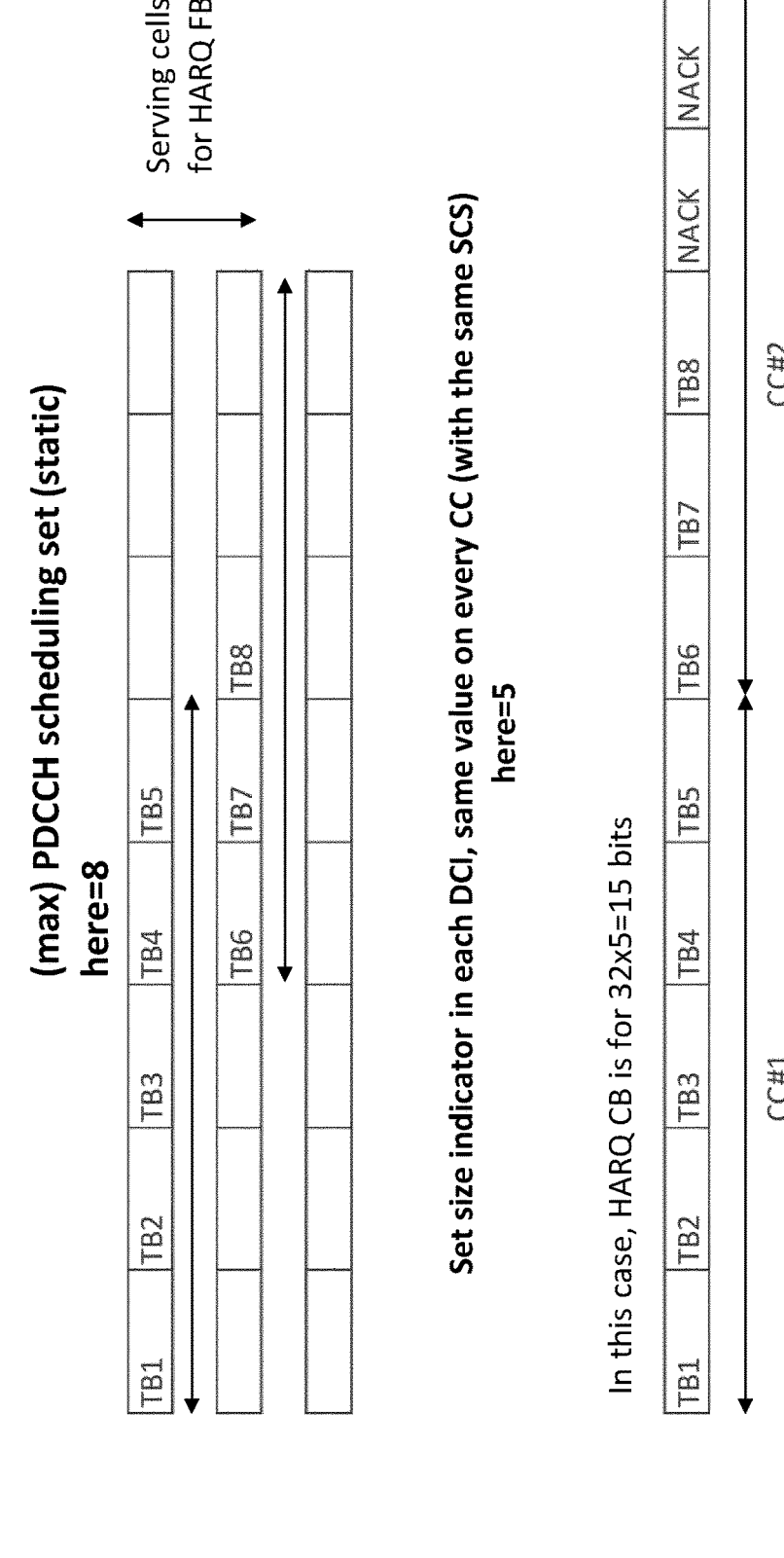
FIG. 8 shows a block diagram of set size indication according to an example embodiment.

FIG. 8 shows an illustration of set size indication according to an example embodiment.

In the example shown in FIG. 8, there are 3 serving cells (denoted as component carriers CC #1-3), and the size of the candidate PDSCH scheduling set is 8 (slots), where the size of the candidate PDSCH scheduling set is predetermined (e.g. by RRC signalling).

The "set size indicators" are included in the DCIs scheduling the Multi-PDSCH transmission and indicate that two serving cells (CC #1 and CC #2) are scheduled, and that the number of HARQ-ACK bits that needs to be included into HARQ-ACK feedback for each serving cell is 5. The criterion for deciding the Set size S on the network side may be the maximum number of TBs or PDSCHs per PDSCH scheduling set among the PDSCH scheduling sets to be reported on the CB. In this case, the maximum number of TBs scheduled per cell (to be reported in this CB) is 5 on CC #1, hence, the Set size S indicates 5.

Based on this information, the UE knows to provide HARQ-ACK feedback for 10 bits as shown on the bottom of the figure, which is a significant reduction compared to the case of semi-static codebook, where the number of bits would be 3×8=24. "NACK" is reported for the cases where there has been no PDSCH reception.

A set size indicator value may be configured to indicate a particular combination of HARQ-ACK bits per PDSCH scheduling set per serving cell that shall be contained on CB.

In another example, the set size indicator could indicate a combination of {CC #1: 8 A/N bits; CC #2: 4 A/N bits; CC #0: 0 A/N bits}.

In the example shown in FIG. 8, the information of set size S is not otherwise available from other DL assignment fields in all DL assignments, e.g. from DL assignment fields in DL assignment scheduling CC #2. Hence, a separate set size S indication is needed in DL assignment. With the Set size indicator, errors may be avoided even if UE misses the DL assignment on CC #1.

The PDSCHs are consecutive in the FIG. 8. However, multi-PUSCH supports only contiguous allocations, and multi-PDSCH design may follow the same principle. If multi-PDSCH supports non-contiguous allocation, corresponding HARQ ACKs may be mapped to the codebook container bits based on the PDSCH scheduled order.

The Set size for CC #2 doesn't start at the beginning of the PDSCH scheduling set, unlike for CC #1. The UE may determine this offset as based on the timing for PDSCHs, if multi-PDSCH design follows the one of multi-PUSCH, the indicated K0 would provide offset with respect to scheduling PDCCH, or HARQ-ACK placement within CB. In the case of single multi-PDSCH DCI per PDSCH scheduling set, there is no need to determine the offset for HARQ-ACK feedback. When UE receives the multi-PDSCH DCI for #002, the HARQ-ACK bits are placed to the corresponding container on CB based on the scheduled order of PDSCHs.

Figure 9:
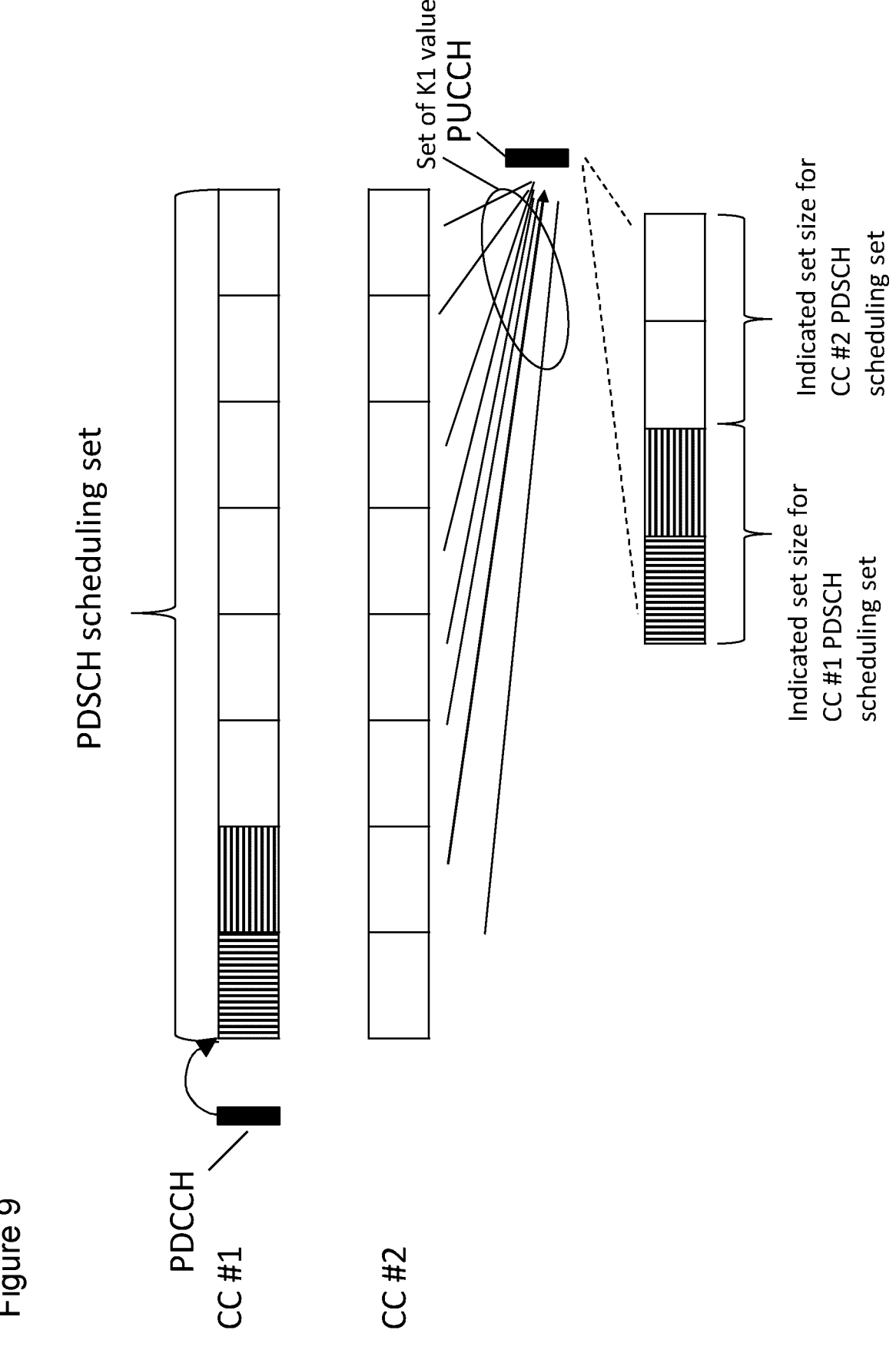
FIG. 9 shows a block diagram of multi-PDSCH scheduling according to an example embodiment.

FIG. 9 shows an example embodiment of the method when applied to multi-PDSCH scheduling. In this example embodiment, a UE is configured with two serving cells, CC #1 and CC #2. PDSCH scheduling set (for each cell) is determined to contain N=8 slots. UE is configured with 8 values for K1. Based on PDSCH configuration supporting 1 TB per PDSCH, UE reports 1 ACK/NACK for each PDSCH.

The candidate PDSCH scheduling sets are determined based on PUCCH slot timing and the set of configured K1 values. In this case, the candidate PDSCH scheduling sets are determined to contain a single PDSCH scheduling set per serving cell, because all K1 values are sourced from the single PDSCH scheduling set. For example, K1 may be indicated as offset from the last scheduled PDSCH among multiple scheduled in the PDSCH scheduling set.

The UE receives a single DL assignment on CC #1, scheduling two PDSCHs (shown in vertical and horizontal dashed lines). The DCI set size indicator S indicates value 4 from the configured value set of {2, 4, 8, 16}. Correspondingly, the UE reports 2 ACK/NACK bits for each PDSCH scheduling set, which results in a codebook size of 4 bits. The HARQ-ACK bits are placed in the first two positions of the HARQ-ACK CB. There are no error cases with respect to ordering of bits, because only one DL assignment per PDSCH scheduling set is assumed.

Figure 10:
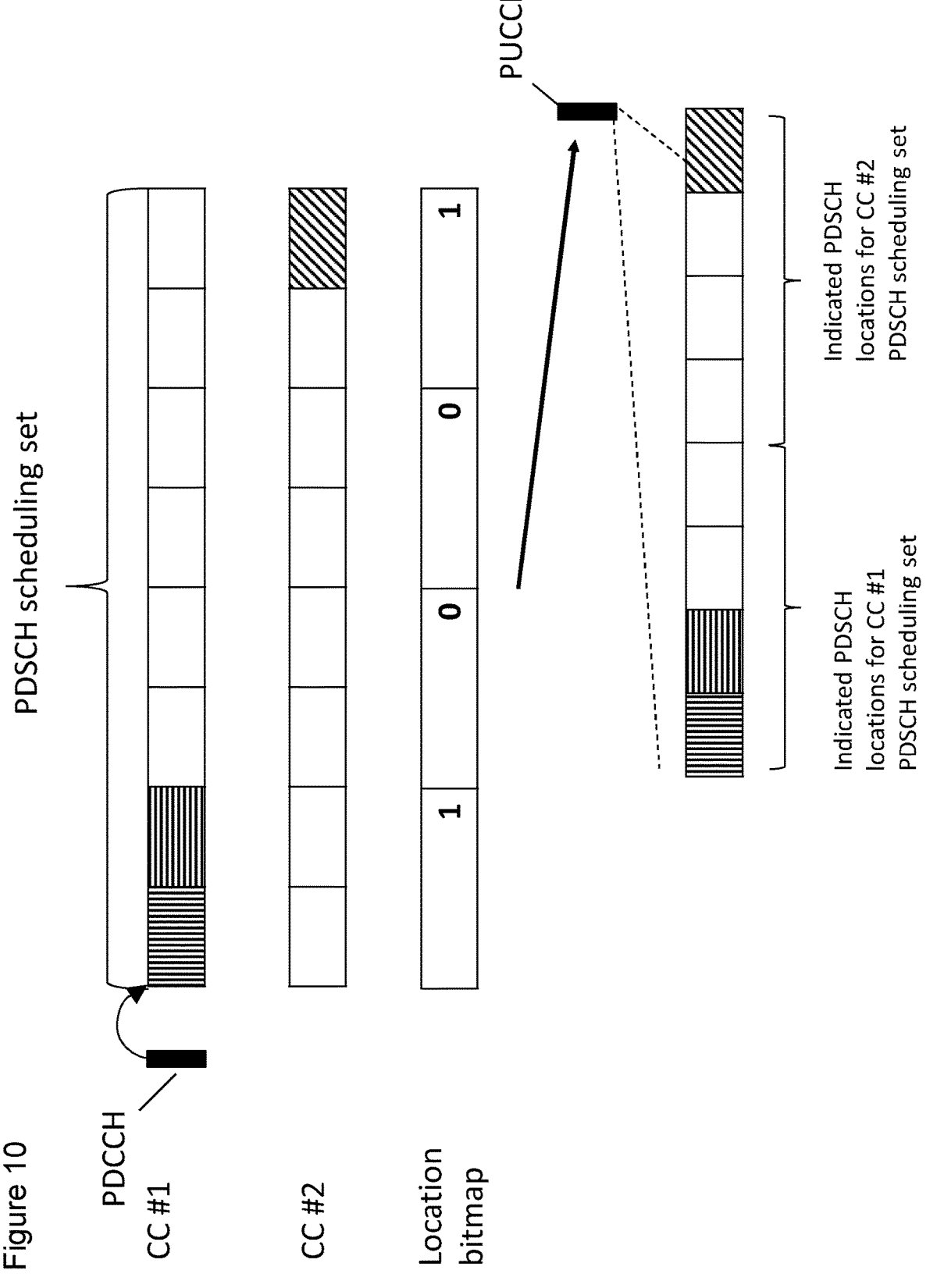
FIG. 10 shows a block diagram of multiple DL assignments per cell according to an example embodiment.

FIG. 10 shows an example embodiment where the method is applied to multiple DL assignments (scheduling a single PDSCH each) per cell per PDCCH monitoring occasion for a similar configuration as in FIG. 9.

In this example embodiment, the UE has received 3 DL assignments scheduling two PDSCHs (shown in horizontal and vertical dashed lines) on CC #1 and one PDSCH (shown in diagonal dashed lines) on CC #2. A DCI Location bitmap L has 4 bits, each bit value corresponding to 2 slots per PDSCH scheduling set. The Location bitmap indicates PDSCH scheduling set slots #1, #2 and #7, #8. Correspondingly, UE reports 4 ACK/NACK bits for each PDSCH scheduling set and for each component carrier, which results in a codebook size of 8 bits.

Figure 11:
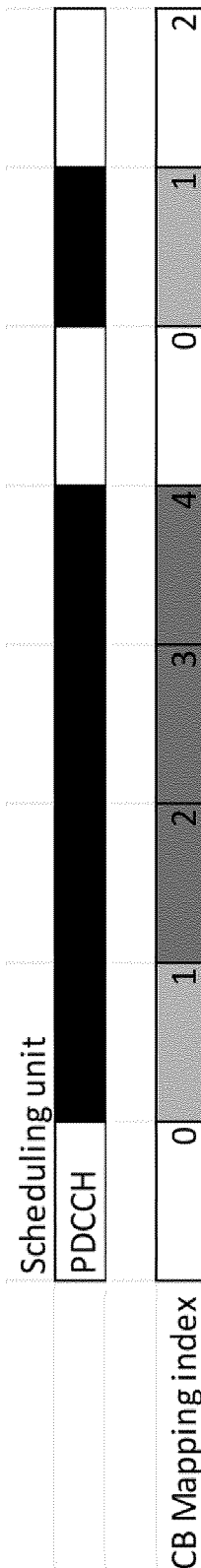
FIG. 11 shows a block diagram of multiple DL assignments per cell according to an example embodiment.
Figure 12:
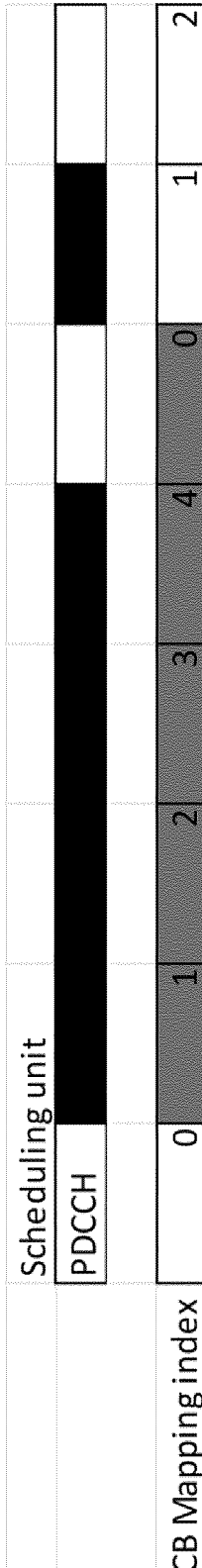
FIG. 12 shows a block diagram of multiple DL assignments per cell according to an example embodiment.

Using the set size indicator, S, in all DL assignments causing HARQ feedback in the same slot may result in scheduling restrictions, as illustrated in FIGS. 11 and 12. In the examples shown in FIGS. 11 and 12, the scheduling set is 8 slots, and the Set size indicator is equal to 5. In this case, the gNB is not allowed to schedule multi-TTI PDSCH (black slots) as shown in FIG. 10, because for two scheduled PDSCH the CB mapping index is the same (index 1 in the example). On the other hand, scheduling in FIG. 12 is allowed, and HARQ-ACK bit mapping is unambiguous. When the gNB multiplexes multiple UEs in TDM fashion within the scheduling set, the gNB may schedule the multi-PDSCH in a contiguous way per UE.

ACK/NACKs for each PDSCH scheduling set may be ordered in a predetermined way, e.g. in the order of PDSCHs scheduled in a DL assignment. If a DL assignment corresponding for a PDSCH scheduling set is not detected, NACKs are inserted to other ACK/NACK positions. The ACK/NACKs for multiple candidate PDSCH scheduling sets may be arranged first over consecutive PDSCH scheduling sets on the same serving cell or component carrier, and then over the configured serving cells.

A UE may be configured with carrier aggregation containing cells with and without multi-PDSCH scheduling (e.g., some serving cells on 60 GHz band and other serving cells on FR1 or FR2 band). In this situation, different CCs may be configured with different PDSCH scheduling set. Nevertheless, the CB construction works independently per CC and for final HARQ feedback, these CBs are concatenated. Nevertheless, all DL assignments should contain set size indicator field with the same configured values. When DL association set applicable Set size indicator is greater than PDSCH scheduling set size on a CC, UE reports CB size corresponding to PDSCH scheduling set only. This reduces overall CB size, without compromising the robustness.

The method is based on a design approach where reception of single DL assignment is enough to determine correct size and bit ordering for CB (if a UE does not receive any DL assignment, it does not transmit HARQ feedback either). Hence, the presented CB design is as robust against DCI detection failures as semi-static Type 1 CB (and more robust than dynamic Type 2 CB). On other hand, the CB size is dynamically adapted based on concurrent PDSCH scheduling, hence providing more efficient CB size determination than Type 1 CB.

Such design requires that at the time when gNB determines first DL assignment, the gNB knows or estimates completely the PDSCH locations for which HARQ-ACK will be reported by UE. If the DL assignments (causing HARQ feedback to same CB) are transmitted at different time instances, the gNB needs to predict its scheduling decisions for next slots. However, in here the PDCCH occurs only once per PDSCH scheduling set, and a single scheduling set already comprises a significant portion of available HARQ processes. Hence, HARQ feedback will typically be transmitted separately for each PDSCH scheduling set, and all corresponding DL assignments are transmitted within the same set of symbols for PDCCH.

In the following examples, the resulting codebook sizes are compared for a case where UE has 2 active serving cells, PDSCH scheduling set comprises 8 slots, the SLIVs are configured so that each slot may contain only one PDSCH, and each PDSCH may comprise two spatial TBs.

Two examples of scheduling as illustrated in FIG. 13.

In scheduling order A, the scheduled PDSCHs fill the PDSCH scheduling set starting from the beginning, and scheduling on both carriers before scheduling PDSCH on the next slot.

In scheduling order B, the scheduled PDSCHs fill the PDSCH scheduling set of one serving cell first before scheduling on the next serving cell.

The codebook sizes for semi-static CBs are:

Type 1 CB: 2 cells=8 slots×1 PDSCH per slot×2 TBs per PDSCH=32 bits

Type 3 CB: 2 cells×16 HARQ process per cell×2 TBs per HARQ process=64 bits

In the examples, at most a 4 bit DCI increase is considered.

In the case of multi-PDSCH scheduling and Type 2 CB, 2 bit DCI increase means 4 PDSCH granularity in the DAI incrementing step while 4 bit DCI increase means 2 PDSCH granularity.

In the case of multiple DL assignments, each scheduling single PDSCH, there is no need to increase DAI fields for Type 2 CB. For this example, using set size indicator is assumed.

In case of scheduling order A, set size indicator values {1, 2, 4, 8} (2 bits) and {1, 2, 3, . . . 8} (3 bits) are considered.

In case of scheduling order B, set size indicator values {1, 2, 4, 8} (2 bits) and Alt.3 with set size indicator values {(CC #1: 1; CC #2: 0), (CC #1: 2; CC #2: 0), (CC #1: 4; CC #2: 0), (CC #1: 6; CC #2: 0), (CC #1: 8; CC #2: 0), (CC #1: 8; CC #2: 2), (CC #1: 8; CC #2: 4), (CC #1: 8; CC #2: 6), (CC #1: 8; CC #2: 8), (CC #1: 6; CC #2: 8), (CC #1: 4; CC #2: 8), (CC #1: 2; CC #2: 8), (CC #1: 0; CC #2: 8), (CC #1: 0; CC #2: 6), (CC #1: 0; CC #2: 4), (CC #1: 0; CC #2: 2)} (4 bits) are considered.

Figure 14:
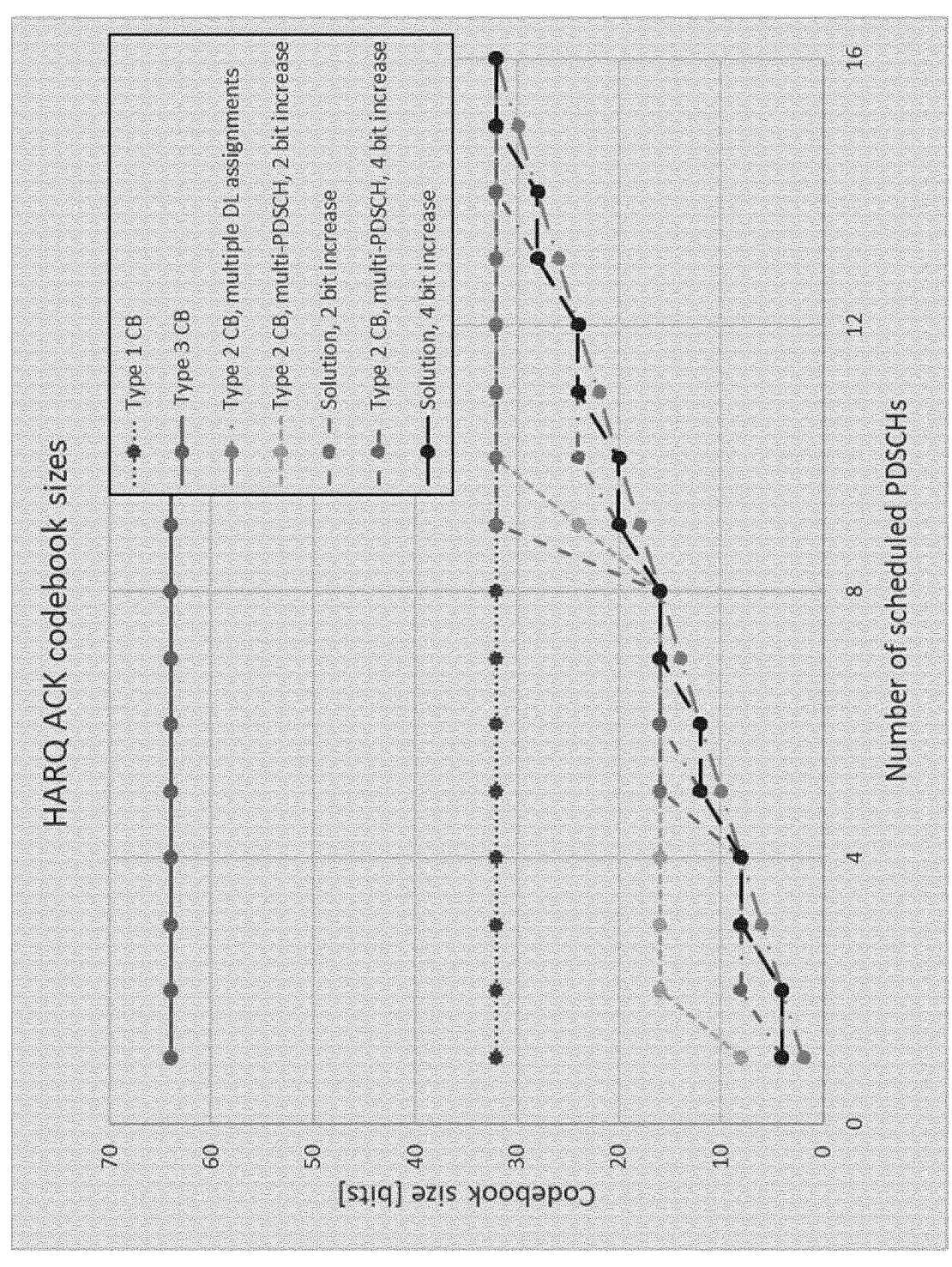
FIG. 14 shows codebook size against the number of scheduled PDSCHs according to an example embodiment.
Figure 15:
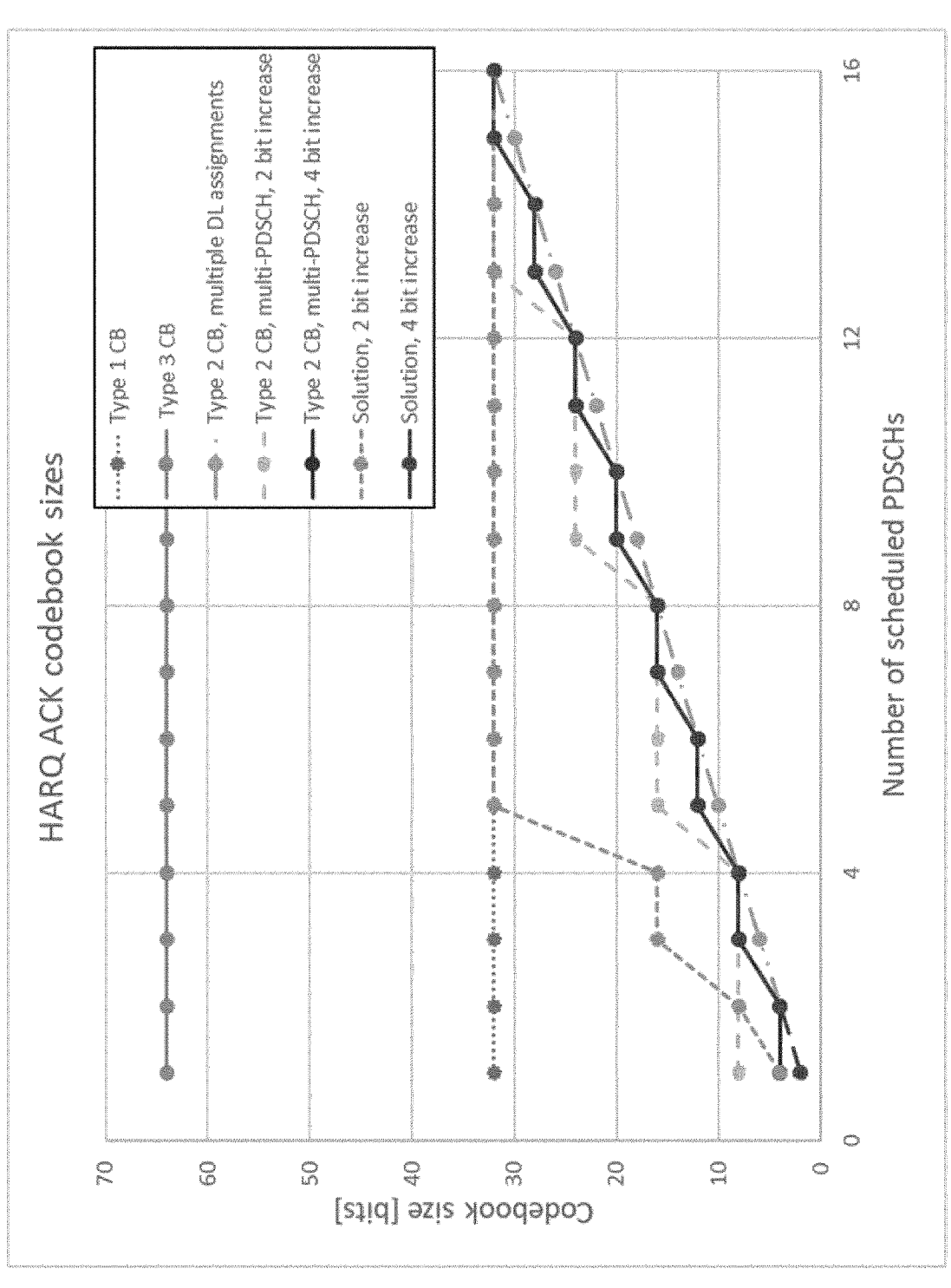
FIG. 15 shows codebook size against the number of scheduled PDSCHs according to an example embodiment.

The codebook sizes are presented in FIG. 14 and FIG. 15. It is seen that the method provides smaller CB sizes than Type 1 or Type 3 CB, which have equal robustness on the CB size determination as the method. In the case of multi-PDSCH scheduling, the method achieves in most cases a CB size that is comparable to dynamic Type 2 CB size.

Figure 16:
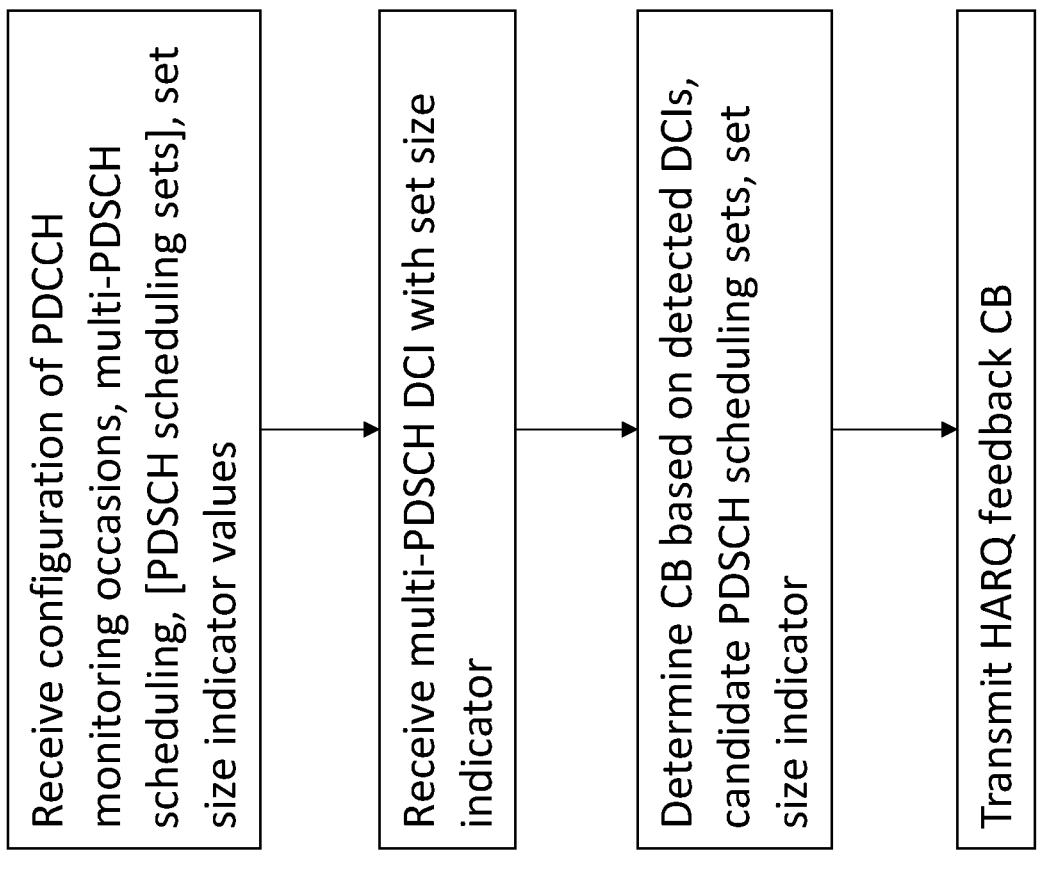
FIG. 16 shows a flow diagram of a method according to an example embodiment.
Figure 17:
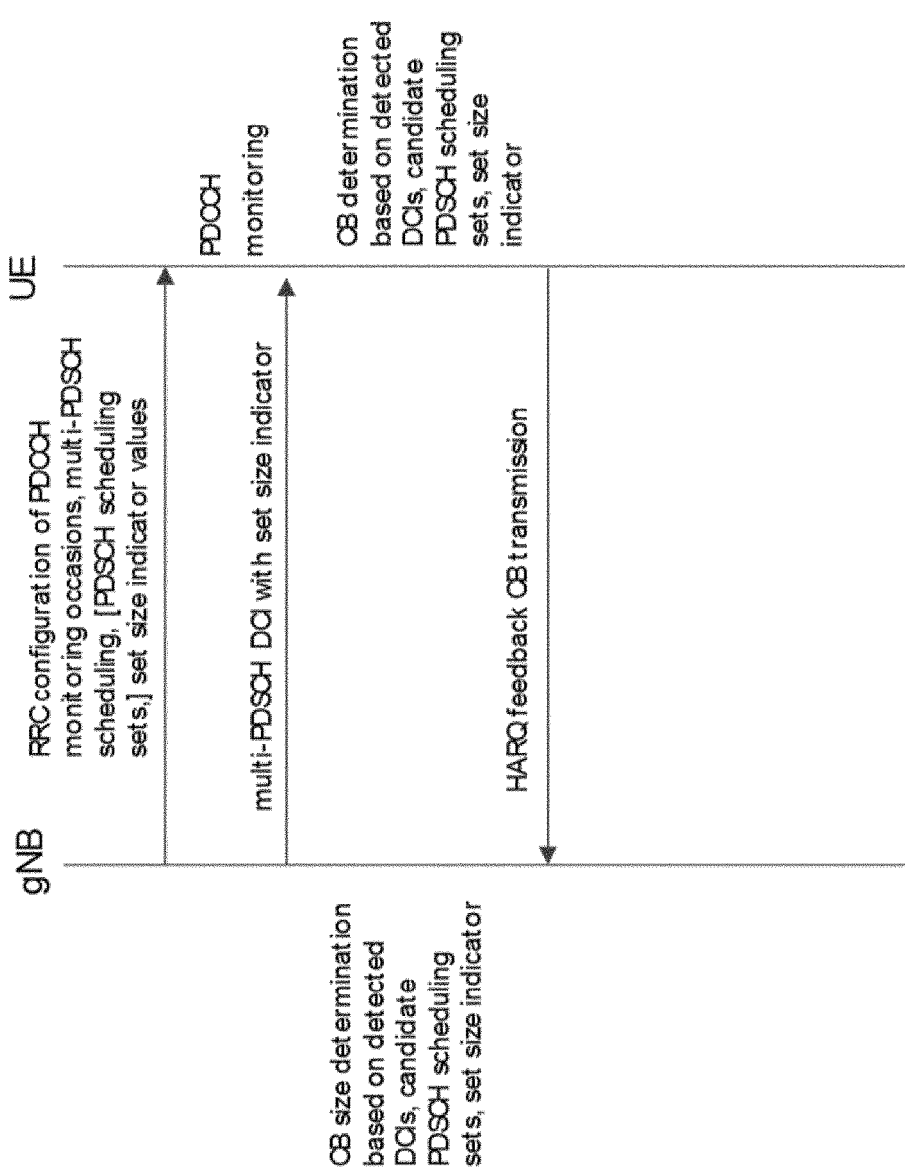
FIG. 17 shows a signalling flow between a gNB and a UE according to an example embodiment.

FIG. 16 shows a block diagram of a method performed at a UE according to an example embodiment and FIG. 17 shows a signalling diagram according to an example embodiment.

In the example embodiments shown in FIGS. 16 and 17, a UE receives RRC configuration of PDCCH monitoring occasions, multi-PDSCH scheduling, PDSCH scheduling sets and a set size indicator value from a gNB. The UE performs PDCCH monitoring and receives a multi-PDSCH DCI with a set size indicator from the gNB. The UEs determine CB based on detected DCIs, candidate PDSCH scheduling sets and set size indicator. The gNB is also aware of the CB size based on these parameters. The UE provides HARQ feedback CB transmission to the gNB.

Figure 18:
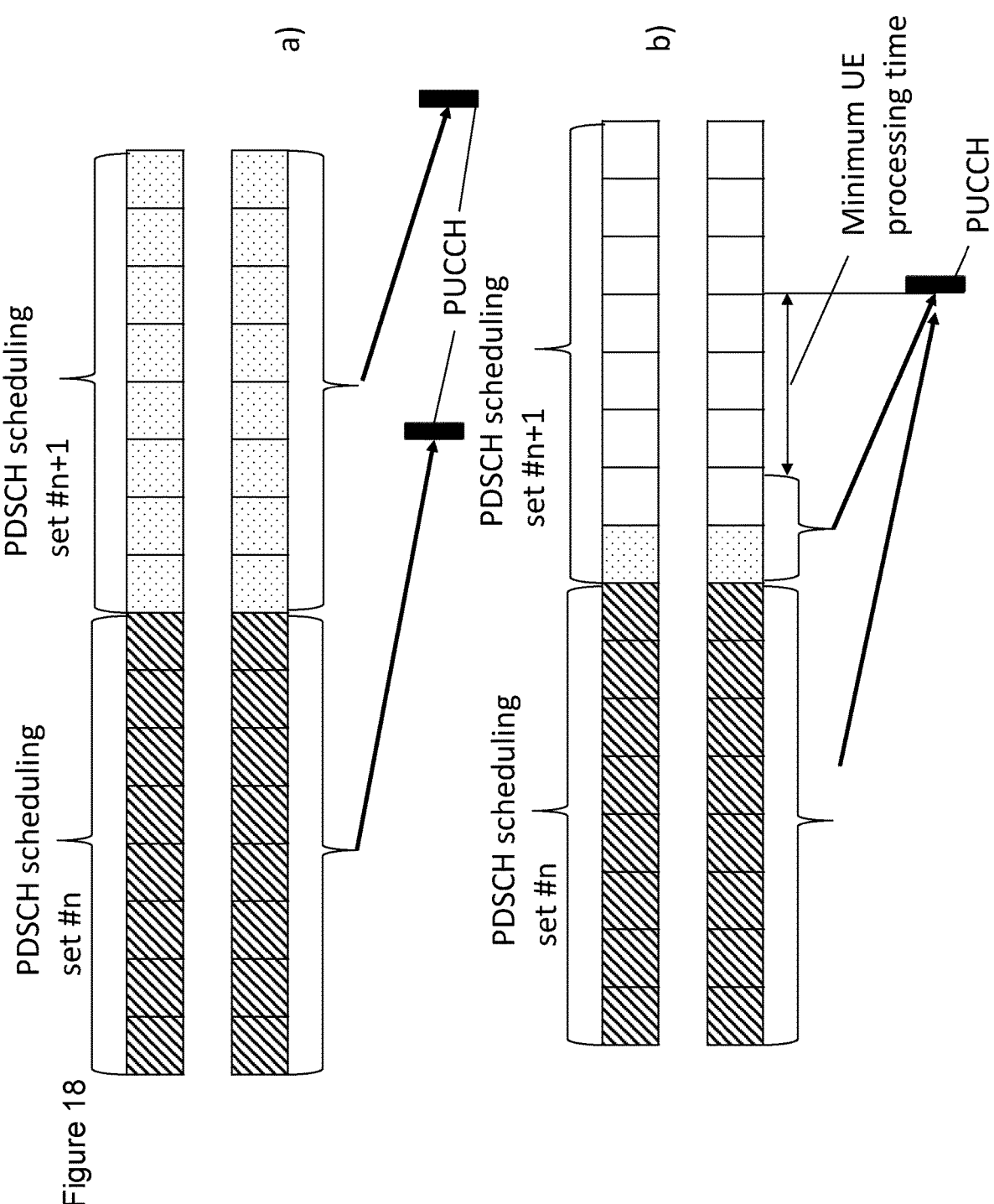
FIG. 18a shows a block diagram where separate HARQ feedback is scheduled for each PDSCH scheduling set.
FIG. 18*b* shows a block diagram where HARQ feedback for two PDSCH scheduling sets is scheduled to the same PUCCH.

HARQ feedback may be typically requested for each PDSCH scheduling set separately, as shown in FIG. 18a. Nevertheless, HARQ feedback for multiple PDSCH scheduling sets may be scheduled to the same PUCCH as shown on an example in FIG. 18b. Due to first PDSCH scheduling set, UE is instructed with Set Size Indicator S to report HARQ feedback for 8 PDSCHs per PDSCH scheduling set. This may not be practical for the second PDSCH scheduling set with the last slots occurring after PUCCH transmission.

HARQ feedback may reported only for K PDSCHs in the last PDSCH scheduling set, where the K=min(S, L) and L is the number of PDSCH candidates occurring in the last PDSCH scheduling set before (PUCCH timing−minimum UE processing time for PDSCH). In FIG. 18*b*, HARQ feedback for the 2 first slots of the second PDSCH scheduling set is reported, while no HARQ feedback is reported for the unshaded slots.

The method described above may facilitate a reduction in Type 1 CB size, improving the HARQ feedback coverage for few scheduled PDSCHs as well as reduces the UCI overhead, while maintaining the robustness of semi-static codebook against DCI detection failures.

In comparison to Type 2 CB, the method may improve the robustness against DCI detection failures at the price of an acceptable increase in the UCI overhead.

The method may be used with multi-PDSCH scheduling as well as with multiple DL assignments (each scheduling a single PDSCH). To operate reasonably, the method requires "sparse" PDCCH monitoring so that there are multiple PDSCH slots after each PDCCH monitoring occasion. Such situation may be faced at 60 GHz as well as in case of cross-carrier scheduling when the scheduling cell employs smaller SCS than the scheduled cell (which is expected to be a frequent case in cross-carrier scheduling.)

This makes the proposed codebook an attractive choice for gNB and UE.

The method may be implemented at user equipment as described with reference to FIG. 2 or a control apparatus as described with reference to FIG. 3.

An apparatus may comprise means for determining, at a user equipment, one or more sets of candidate slots for physical downlink shared channel reception for which feedback information is to be provided in a given slot, receiving at least one indication of resources within one of the one or more sets of candidate slots for which feedback information is to be provided in the given slot, determining a feedback codebook based on the one or more sets of candidate slots and the indication and providing feedback information according to the feedback codebook.

Alternatively, or in addition, an apparatus may comprise means for providing at least one indication of resources to a user equipment for which feedback information is to be provided in a given slot, wherein the resources are within one of one or more sets of candidate slots for physical downlink shared channel reception at the user equipment for which feedback information is to be provided in the given slot and receiving feedback information from the user equipment according to a feedback codebook based on the one or more sets of candidate slots and the indication.

It should be understood that the apparatuses may comprise or be coupled to other units or modules etc., such as radio parts or radio heads, used in or for transmission and/or reception.

Although the apparatuses have been described as one entity, different modules and memory may be implemented in one or more physical or logical entities.

It is noted that whilst embodiments have been described in relation to LTE and 5G NR, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

The invention claimed is:

1. An apparatus comprising at least one processor and at least one memory, said at least one memory stored with computer program code thereon, the at least one memory and the computer program code configured to, with the at least one processor, cause the apparatus at least to:

determine, at a user equipment, one or more sets of candidate slots for physical downlink shared channel reception for which feedback information is to be provided in a given slot;

receive at least one indication of resources within one of the one or more sets of candidate slots for which feedback information is to be provided in the given slot;

determine a feedback codebook based on the one or more sets of candidate slots and the at least one indication of resources; and provide feedback information according to the feedback codebook, wherein the at least one indication of resources comprises:

an indication of serving cells in the resources within the candidate slots for which feedback information is to be provided, a bitmap of resources within the set of candidate slots for which feedback is provided, and an indication of a number of bits to be included in the feedback information, wherein the indication of the number of bits to be included in the feedback information comprises an integer fraction of a candidate slot set size, wherein the set size indicator comprises:

a number of hybrid automatic repeat request acknowledgement bits to be included into hybrid automatic repeat request acknowledgement feedback for a physical downlink shared channel transmitted in candidate physical downlink shared channel scheduling sets, where the number of hybrid automatic repeat request acknowledgement bits is common for all serving cells in the candidate physical downlink shared channel scheduling sets, and an indication of the serving cells in the candidate physical downlink shared channel scheduling sets, for which hybrid automatic repeat request acknowledgement feedback will be provided.

2. The apparatus according to claim 1, wherein the at least one memory and the computer program code configured to, with the at least one processor, further cause the apparatus at least to:

determine the one or more sets of candidate slots based on the given slot and a plurality of feedback transmission slot timing values configured to the user equipment;

monitor a control channel for downlink scheduling assignments every $M^{th}$ slot, where M is greater than 1; and determine the one or more sets of candidate slots based on the value of M, wherein the one or more sets of candidate slots comprises one or more serving cells, and wherein each of the more than one sets of candidate slots is per serving cell and the indication of the resources within one of the sets of candidate slots is common for each serving cell.

3. The apparatus according to claim 1, wherein the indication of resources is common for each of the more than one sets of candidate slots.

4. The apparatus according to claim 1, wherein the indication of the number of bits to be included in the feedback information is per set of candidate slots.

5. The apparatus according to claim 1, wherein the indication of the number of bits to be included in the feedback information comprises an integer fraction of the number of slots in the one or more sets of candidate slots.

6. The apparatus according to claim 1, wherein the at least one memory and the computer program code configured to, with the at least one processor, further cause the apparatus at least to:

receive the indication of resources in downlink control information comprising assignments for one or more physical downlink shared channel transmissions, and wherein the indication of resources further comprises an indication of a number of bits to be included in the feedback information, wherein the indication of the number of bits to be included in the feedback information comprises an integer fraction of the candidate slot set size, wherein the at least one memory and the computer program code configured to, with the at least one processor, further cause the apparatus at least to:

replace the set size indicator with a location bitmap that indicates the slots within the scheduling set for which user equipment should report hybrid automatic repeat request feedback, wherein a time granularity of the location bitmap comprises one or more slots and the location bitmap is per hybrid automatic repeat request acknowledgement feedback transmission and all downlink assignments causing hybrid automatic repeat request acknowledgement feedback on the same slot indicate the same location bitmap.

7. An apparatus comprising at least one processor and at least one memory, said at least one memory stored with computer program code thereon, the at least one memory and the computer program code configured to, with the at least one processor, cause the apparatus at least to:

provide at least one indication of resources to a user equipment for which feedback information is to be provided in a given slot, wherein the resources are within one of one or more sets of candidate slots for physical downlink shared channel reception at the user equipment which feedback information is to be provided in the given slot; and receive feedback information from the user equipment according to a feedback codebook based on the one or more sets of candidate slots and the at least one indication of resources, wherein the at least one indication of resources comprises:

an indication of serving cells in the resources within the candidate slots for which feedback information is to be provided, a bitmap of resources within the set of candidate slots for which feedback is provided, and an indication of a number of bits to be included in the feedback information, wherein the indication of the number of bits to be included in the feedback information comprises an integer fraction of a candidate slot set size, wherein the set size indicator comprises:

a number of hybrid automatic repeat request acknowledgement bits to be included into hybrid automatic repeat request acknowledgement feedback for a physical downlink shared channel transmitted in candidate physical downlink shared channel scheduling sets, where the number of hybrid automatic repeat request acknowledgement bits is common for all serving cells in the candidate physical downlink shared channel scheduling sets, and an indication of the serving cells in the candidate physical downlink shared channel scheduling sets, for which hybrid automatic repeat request acknowledgement feedback will be provided.

8. The apparatus according to claim 7, wherein the user equipment monitors a control channel for downlink scheduling assignments every $M^{th}$ slot, where M is greater than 1.

9. The apparatus according to claim 7, wherein each of the one or more sets of candidate slots comprises one or more serving cells.

10. The apparatus according to claim 9, wherein each of the more than one sets of candidate slots is per serving cell and the indication of the resources within one of the sets of candidate slots is common for each serving cell.

11. The apparatus according to claim 7, wherein the indication of resources is common for each of the more than one sets of candidate slots.

12. The apparatus according to claim 7, wherein the indication of the number of bits to be included in the feedback information is per set of candidate slots.

13. The apparatus according to claim 7, wherein the indication of the number of bits to be included in the feedback information comprises an integer fraction of the number of slots in the one or more sets of candidate slots.

14. A method comprising:

determining, at a user equipment, one or more sets of candidate slots for physical downlink shared channel reception for which feedback information is to be provided in a given slot;

receiving at least one indication of resources within one of the one or more sets of candidate slots for which feedback information is to be provided in the given slot;

determining a feedback codebook based on the one or more sets of candidate slots and the at least one indication of resources; and providing feedback information according to the feedback codebook, wherein the at least one indication of resources comprises:

an indication of serving cells in the resources within the candidate slots for which feedback information is to be provided, and a bitmap of resources within the set of candidate slots for which feedback is provided, and an indication of a number of bits to be included in the feedback information, wherein the indication of the number of bits to be included in the feedback information comprises an integer fraction of a candidate slot set size, wherein the set size indicator comprises:

a number of hybrid automatic repeat request acknowledgement bits to be included into hybrid automatic repeat request acknowledgement feedback for a physical downlink shared channel transmitted in candidate physical downlink shared channel scheduling sets, where the number of hybrid automatic repeat request acknowledgement bits is common for all serving cells in the candidate physical downlink shared channel scheduling sets, and an indication of the serving cells in the candidate physical downlink shared channel scheduling sets, for which hybrid automatic repeat request acknowledgement feedback will be provided.

\*　\*　\*　\*　\*